(12) United States Patent
Kyoso et al.

(10) Patent No.: US 10,046,582 B2
(45) Date of Patent: Aug. 14, 2018

(54) IMAGE RECORDING APPARATUS AND METHOD OF DETECTING DEFECTIVE RECORDING ELEMENT

(71) Applicant: FUJIFILM Corporation, Tokyo (JP)

(72) Inventors: Tadashi Kyoso, Kanagawa (JP); Jun Yamanobe, Kanagawa (JP); Katsuto Sumi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 5 days.

(21) Appl. No.: 15/354,203

(22) Filed: Nov. 17, 2016

(65) Prior Publication Data

US 2017/0066268 A1    Mar. 9, 2017

Related U.S. Application Data

(63) Continuation of application No. PCT/JP2015/063195, filed on May 7, 2015.

(30) Foreign Application Priority Data

Jun. 4, 2014 (JP) .................................. 2014-115725

(51) Int. Cl.
*B41J 29/38* (2006.01)
*B41J 29/393* (2006.01)
(Continued)

(52) U.S. Cl.
CPC ............. *B41J 29/393* (2013.01); *B41J 2/155* (2013.01); *B41J 2/21* (2013.01); *B41J 2/2142* (2013.01);
(Continued)

(58) Field of Classification Search
CPC combination set(s) only.
See application file for complete search history.

(56) References Cited

U.S. PATENT DOCUMENTS 6,726,318 B2 * 4/2004 Arakawa .................. B41J 2/125
                                                          347/106
8,936,342 B2    1/2015 Ueshima
(Continued)

FOREIGN PATENT DOCUMENTS

JP    2001-105633 A    4/2001
JP    2004-195704 A    7/2004
(Continued)

OTHER PUBLICATIONS

International Search Report issued in PCT/JP2015/063195; dated Jun. 30, 2015.
(Continued)

*Primary Examiner* — Matthew Luu
*Assistant Examiner* — Lily Kemathe
(74) *Attorney, Agent, or Firm* — Studebaker & Brackett PC

(57) ABSTRACT

Provided are an image recording apparatus that efficiently detects defective recording elements causing image defects in a plurality of recording heads and a method of detecting the defective recording elements. An image recording apparatus including: a plurality of recording heads; an indicator acquisition unit for acquiring an indicator which relatively indicates how easily image defects are visually perceived for each color, an appearance ratio setting unit for setting an appearance ratio of a test pattern as a higher value as the indicator of each color becomes higher; a recording unit for recording the test pattern of each color on a recording medium at the appearance ratio; an imaging unit for capturing an image of the test pattern which is recorded on the recording medium; and an analysis unit for analyzing the captured test pattern and detecting a defect of a recording element in the recording head.

20 Claims, 14 Drawing Sheets

(51) Int. Cl.
*B41J 2/155* (2006.01)
*B41J 2/21* (2006.01)
*H04N 1/60* (2006.01)
*B41J 25/00* (2006.01)

(52) U.S. Cl.
CPC ............ B41J 2/2146 (2013.01); B41J 29/38 (2013.01); H04N 1/6033 (2013.01); H04N 1/6036 (2013.01); *B41J 2025/008* (2013.01)

(56) References Cited

U.S. PATENT DOCUMENTS

| | | | | |
|---|---|---|---|---|
| 9,201,990 | B2* | 12/2015 | Wakamatsu | G03F 7/0002 |
| 9,278,520 | B2* | 3/2016 | Kamiyanagi | B41J 2/0451 |
| 2003/0103131 | A1* | 6/2003 | Arakawa | B41J 2/125 |
| | | | | 347/106 |
| 2004/0208662 | A1* | 10/2004 | Ichikawa | G03G 15/0131 |
| | | | | 399/49 |
| 2005/0249515 | A1* | 11/2005 | Furukawa | G03G 15/1625 |
| | | | | 399/53 |
| 2006/0092211 | A1* | 5/2006 | Arakawa | B41J 2/16579 |
| | | | | 347/19 |
| 2006/0187507 | A1 | 8/2006 | Konno et al. | |
| 2009/0167799 | A1* | 7/2009 | Chung | B41J 2/04508 |
| | | | | 347/12 |
| 2011/0090276 | A1* | 4/2011 | Hirano | B41J 2/2132 |
| | | | | 347/14 |
| 2011/0096115 | A1* | 4/2011 | Mizutani | B41J 2/1753 |
| | | | | 347/14 |
| 2011/0234673 | A1* | 9/2011 | Ueshima | B41J 2/2139 |
| | | | | 347/14 |
| 2014/0063101 | A1* | 3/2014 | Hattori | B41J 2/2142 |
| | | | | 347/14 |
| 2015/0174911 | A1* | 6/2015 | Hoshii | B41J 2/07 |
| | | | | 347/12 |
| 2015/0273820 | A1* | 10/2015 | Nakajima | B41J 11/0085 |
| | | | | 347/14 |
| 2015/0336381 | A1* | 11/2015 | Kyoso | B41J 2/0451 |
| | | | | 347/14 |

FOREIGN PATENT DOCUMENTS

| | | |
|---|---|---|
| JP | 2004-351766 A | 12/2004 |
| JP | 2006-142807 A | 6/2006 |
| JP | 2010-000684 A | 1/2010 |
| JP | 2013-163318 A | 8/2013 |
| JP | 2014-004736 A | 1/2014 |

OTHER PUBLICATIONS

Written Opinion issued in PCT/JP2015/063195; dated Jun. 30, 2015.

* cited by examiner

IMAGE RECORDING APPARATUS AND METHOD OF DETECTING DEFECTIVE RECORDING ELEMENT

CROSS-REFERENCE TO RELATED APPLICATIONS

This application is a Continuation of PCT International Application No. PCT/JP2015/063195 filed on May 7, 2015, which claims priority under 35 U.S.C § 119(a) to Japanese Patent Application No. 2014-115725 filed on Jun. 4, 2014. Each of the above application(s) is hereby expressly incorporated by reference, in its entirety, into the present application.

BACKGROUND OF THE INVENTION

1. Field of the Invention

The present invention relates to an image recording apparatus and a method of detecting a defective recording element, and particularly relates to a technology for detecting a defective recording element that causes image defects in a plurality of recording heads.

2. Description of the Related Art

In an ink jet recording apparatus that records a full color image, normally a recording head is provided for each of the inks of a plurality of colors such as cyan, magenta, yellow, and black, and the recording heads eject the inks of the respective colors onto a recording medium.

In order to determine whether a state of ejection of the recording head is normal, a method of recording a test pattern recorded for each recording head and determining whether each nozzle of the recording head is normal on the basis of the recorded test pattern has been performed.

JP2013-163318A discloses a technology for determining a frequency of evaluation for each recording head on the basis of a frequency of occurrence of a defective nozzle such as a nozzle causing ink ejection failure, which means that ink is not ejected, or a nozzle causing misalignment in landing which means misalignment between landing positions of ejected inks and desired landing positions thereof. Further, JP2014-4736A discloses a method of printing test patterns of respective colors in a predetermined order.

SUMMARY OF THE INVENTION

Even if a nozzle causing ink ejection failure or a nozzle causing misalignment in landing occurs, the nozzle may not generate streaks as image defects. For example, in a case where a highlight image is recorded, even if there are nozzles causing ink ejection failure or misalignment in landing, streaks are not visually perceived, and image defects do not occur. That is, in a manner similar to JP2013-163318A, only by determining the frequency of evaluation of each recording head on the basis of information of a defective nozzle of the recording head, it cannot be said that a nozzle causing occurrence of image defects is efficiently detected.

The present invention has been made in consideration of such a situation, and has an object to provide an image recording apparatus that efficiently detects a defective recording element causing image defects in a plurality of recording heads and a method of detecting the defective recording element.

In order to achieve the object, according to an aspect, there is provided an image recording apparatus comprising: a plurality of recording heads that respectively eject inks with different colors from recording elements; an indicator acquisition unit for acquiring an indicator which relatively indicates how easily image defects are visually perceived for each color; an appearance ratio setting unit for setting an appearance ratio of a test pattern as a higher value as the indicator of each color becomes higher; a recording unit for recording the test pattern of each color on a recording medium at the appearance ratio through the plurality of recording heads; an imaging unit for capturing an image of the test pattern which is recorded on the recording medium; and an analysis unit for analyzing the captured test pattern and detecting a defective recording element in the recording head that has recorded the test pattern.

According to the present aspect, the indicator, which relatively indicates how easily image defects are visually perceived for each color, is acquired, and the test pattern of each color is recorded on the recording medium at an appearance ratio which is set as a higher value as the indicator of each color becomes higher. Therefore, it is possible to increase a frequency of analysis for a recording head of a color, in which image defects are easily visually perceived, among the plurality of recording heads that eject inks from the recording elements. Thereby, it is possible to efficiently detect a defective recording element that causes image defects from the plurality of recording heads.

It is preferable that the image recording apparatus further comprises a storage unit for storing the indicator according to a density, and the indicator acquisition unit acquires the indicator according to the density of a recorded image. Thereby, it is possible to efficiently detect a defective recording element that causes image defects in accordance with the density of the recorded image.

It is preferable that the indicator, which relatively indicates how easily image defects are visually perceived for each color, is a proportion of the number of image defects which are visually perceived in an image of each color obtained by recording the same image for each ink color. Thereby, it is possible to set an appropriate indicator.

It is preferable that the image recording apparatus further comprises a printing proportion acquisition unit for acquiring a printing proportion of each color for the recorded image, and the indicator acquisition unit sets the indicator as a higher value as the printing proportion of each color becomes higher. Thereby, it is possible to appropriately set the appearance ratio of the test pattern of each color.

It is preferable that the printing proportion of each color is a proportion of an amount of the ink of each color ejected for the recorded image. Thereby, it is possible to appropriately estimate a probability of occurrence of streaks of each color for the recorded image.

Further, the printing proportion of each color may be a proportion of the number of ejection operations of the ink of each color ejected for the recorded image. In particular, in a case where the density of the recorded image is biased, it is possible to appropriately estimate a probability of occurrence of streaks of each color for the recorded image.

It is preferable that the printing proportion acquisition unit divides the recorded image into a plurality of regions, and acquires the printing proportion of each color for each of the divided regions, the appearance ratio setting unit sets the appearance ratio for each of the divided regions, and the recording unit records the test pattern of each color at the appearance ratio for each of the divided regions. Thereby, it is possible to increase the frequency of analysis for a recording head of a color, in which image defects are easily visually perceived, in accordance with a distribution of colors of the recorded image.

It is preferable that the image recording apparatus further comprises a transporting unit for transporting the recording medium to the plurality of recording heads only once, the plurality of recording heads are a plurality of line heads each of which recording elements arranged to extend in a direction perpendicular to a transport direction of the recording medium, and the printing proportion acquisition unit divides the recorded image into a plurality of regions in the transport direction of the transporting unit. Thereby, it is possible to increase the frequency of analysis for the line head of a color, in which image defects are easily visually perceived, in accordance with a distribution of colors of the recorded image in a direction perpendicular to the transport direction of the recording medium.

The recorded image may be an image in which a plurality of images each having the same size is imposed. The present aspect is appropriate for recording the recorded image in which a plurality of images each having the same size is imposed.

The appearance ratio setting unit may set the appearance ratio of a color to 0, where for the color, the indicator, the printing proportion, or a proportion of a product of the indicator and the printing proportion is less than a threshold value. In such a manner, analysis for a recording head of a color in which image defects are assumed not to have been actually caused is not performed, whereby it is possible to efficiently detect the defective recording element that causes image defects.

It is preferable that, assuming that the number of recording heads is i and the number of test patterns to be recorded is j, the recording unit records the first i test patterns by using the i recording heads one by one, and records the remaining (j−i) test patterns at the appearance ratio which is set for each color. Thereby, it is possible to detect a defective recording element at an early stage even in a head of which the indicator is low.

In order to achieve the object, according to an aspect, there is provided a method of detecting a defective recording element using the image recording apparatus comprising: an indicator acquisition step of acquiring an indicator which relatively indicates how easily image defects are visually perceived for each color of respective inks with different colors ejected from recording elements by a plurality of recording heads; an appearance ratio setting step of setting an appearance ratio of a test pattern as a higher value as the indicator of each color becomes higher; a recording step of recording the test pattern of each color on a recording medium at the appearance ratio through the plurality of recording heads; an imaging step of capturing an image of the test pattern which is recorded on the recording medium; and an analysis step of analyzing the captured test pattern and detecting a defective recording element in the recording head that has recorded the test pattern.

According to the present aspect, the indicator, which relatively indicates how easily image defects are visually perceived for each color, is acquired, and the test pattern of each color is recorded on the recording medium at the appearance ratio which is set as a higher value as the indicator of each color becomes higher. Therefore, it is possible to increase a frequency of analysis for the recording head of a color, in which image defects are easily visually perceived, among the plurality of recording heads that eject inks from the recording elements. Thereby, it is possible to efficiently detect the defective recording element that causes image defects, from the plurality of recording heads.

According to the present invention, by increasing the frequency of analysis for the recording head of a color in which image defects are visually perceived among the plurality of recording heads, it is possible to efficiently detect the defective recording element that causes image defects.

DESCRIPTION OF THE PREFERRED EMBODIMENTS

Hereinafter, preferred embodiments of the present invention will be described in detail with reference to the accompanying drawings.

<First Embodiment>
<Overall Configuration of Ink Jet Recording Apparatus>

Figure 1:
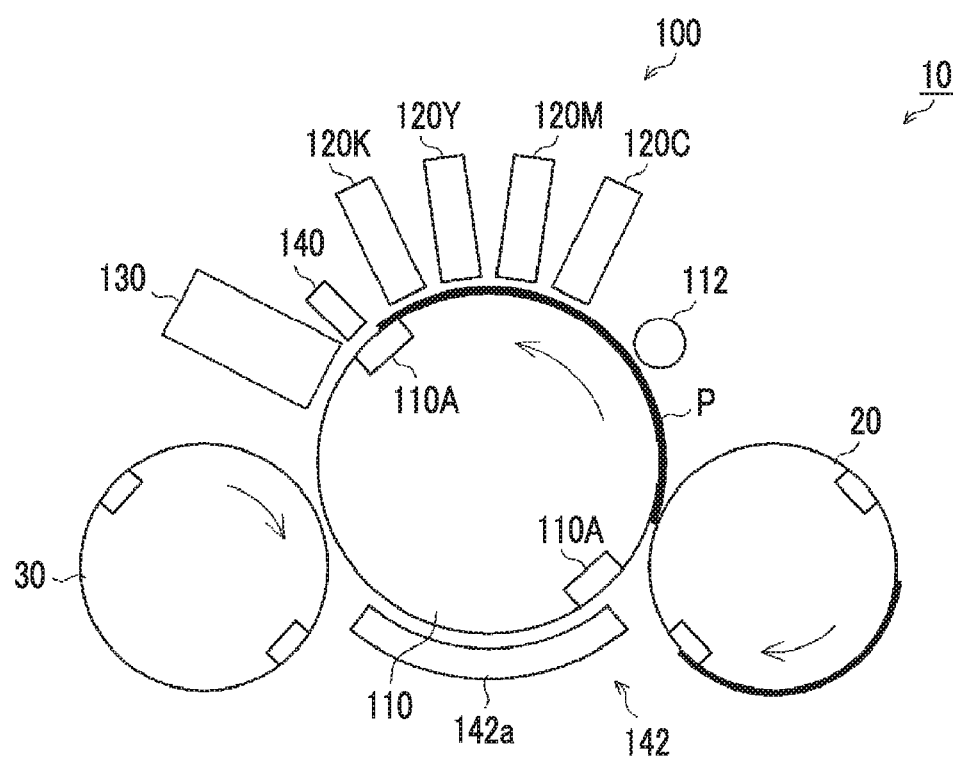
FIG. 1 is an overall configuration diagram illustrating an embodiment of an ink jet recording apparatus.

The ink jet recording apparatus 10 (corresponding to an image recording apparatus) is a cut-sheet-type aqueous ink jet printer that records an image on a sheet of paper P (corresponding to a recording medium) in an ink jet manner by using aqueous ink. As shown in FIG. 1, the ink jet recording apparatus 10 comprises mainly a transporting drum 20, an image recording unit 100, and a transporting drum 30. The transporting drum 20 transports sheets of paper P which are fed from a sheet feeding unit (not shown in the drawing). The image recording unit 100 records an image on a surface (recording surface) of the sheet of paper P, which is transferred from the transporting drum 20, in an ink jet manner by using aqueous ink. The transporting drum 30 transports the sheet of paper P, on which an image is recorded through the image recording unit 100, up to a sheet discharging unit (not shown in the drawing).

The image recording unit 100 records a color image by providing liquid droplets of inks of respective colors on the recording surface of the sheet of paper P while transporting the sheet of paper P. The image recording unit 100 is principally constituted by an image recording drum 110 which transports the sheet of paper P, a sheet pressing roller 112, ink jet heads (corresponding to a recording head, hereinafter simply called "head") 120C, 120M, 120Y, and 120K, an imaging unit 130, a mist filter 140 which captures ink mist, and a drum temperature adjustment unit 142. The sheet pressing roller 112 presses the sheet of paper P transported by the image recording drum 110 and brings the sheet of paper P into tight contact with a circumferential surface of the image recording drum 110. The heads 120C, 120M, 120Y, and 120K eject ink droplets of respective colors of cyan (C), magenta (M), yellow (Y), and black (K) on sheet of paper P. The imaging unit 130 reads an image recorded on the sheet of paper P.

The image recording drum 110 is a transporting unit for a sheet of paper P in the image recording unit 100. The image recording drum 110 is formed in a cylindrical shape so as to rotate about a center of a cylinder by being driven by a motor not shown in the drawing. A gripper 110A is provided on the outer circumferential surface of the image recording drum 110, and a leading end of the sheet of paper P is gripped by this gripper 110A. The image recording drum 110 transports the sheet of paper P while the sheet of paper P is wrapped about the circumferential surface of the drum, by gripping a leading end of the sheet of paper P with the gripper 110A and rotating.

Further, a plurality of suction holes (not shown in the drawing) are formed in a predetermined pattern on the outer circumferential surface of the image recording drum 110. The sheet of paper P, which is wrapped about the circumferential surface of the image recording drum 110, is transported while being held by suction on the circumferential surface of the image recording drum 110, by being suctioned through the suction holes. Thereby, it is possible to transport the sheet of paper P with a high degree of flatness.

The suctioning from the suction holes acts only in a region ranging between a predetermined suction start position and a predetermined suction end position. The suction start position is set, for example, at the position where the sheet pressing roller 112 is provided, and the suction end position is set, for example, at a position where the sheet of paper is transferred to the transporting drum 30. That is, the suction region is set in such a manner that the sheet of paper P is suctioned and held against the outer circumferential surface of the image recording drum 110 at least at the ink droplet ejection positions of the heads 120C, 120M, 120Y, and 120K and at the image reading position of the imaging unit 130. The mechanism for suctioning and holding the sheet of paper P on the circumferential surface of the image recording drum 110 is not limited to a suctioning method based on negative pressure as described above, and it is also possible to employ a method based on electrostatic suction.

Further, the image recording drum 110 of the present example is configured such that grippers 110A are provided at two positions on the outer circumferential surface, whereby two sheets of paper P can be transported in one revolution of the drum. Rotation of the transporting drum 20 and the image recording drum 110 is controlled so as to match the transfer timings of the sheets of paper P onto and off from the drums. Likewise, rotation of the image recording drum 110 and the transporting drum 30 is controlled so as to match the transfer timings of the sheets of paper P onto and off from the drums. In other words, the transporting drum 20, the image recording drum 110, and the transporting drum 30 are driven so as to have the same circumferential speed, and are also driven such that the positions of the respective grippers match each other.

The sheet pressing roller 112 is provided in the vicinity of the sheet reception position on the image recording drum 110 (the position where the sheet of paper P is received from the transporting drum 20). The sheet pressing roller 112 is constituted by a rubber roller, and is provided so as to be pressed and abutted against the circumferential surface of the image recording drum 110. The sheet of paper P, which has been transferred from the transporting drum 20 to the image recording drum 110, is nipped upon passing the sheet pressing roller 112, and is brought into tight contact with the circumferential surface of the image recording drum 110.

The four heads 120C, 120M, 120Y, and 120K are arranged at a certain spacing apart in the transport path of the sheet of paper P by the image recording drum 110. The heads 120C, 120M, 120Y, and 120K are constituted by line heads corresponding to the width of the sheet of paper P. The heads 120C, 120M, 120Y, and 120K are arranged in substantially perpendicular to the direction of transport of the sheet of paper P by the image recording drum 110, and are also arranged in such a manner that the nozzle surfaces thereof oppose the circumferential surface of the image recording drum 110. The heads 120C, 120M, 120Y, and 120K record an image on the recording surface of the sheet of paper P transported by the image recording drum 110, by ejecting liquid droplets of ink toward the image recording drum 110 from the nozzle array formed on the nozzle surfaces.

The imaging unit 130 is an imaging unit for capturing an image recorded on the recording surface of the sheet of paper P by the heads 120C, 120M, 120Y, and 120K, and is provided on the downstream side of the head 120K which is positioned at the last position in the direction of transport of the sheet of paper P by means of the image recording drum 110. The imaging unit 130 includes a line sensor constituted by a solid-state imaging element, such as a charge-coupled device (CCD) or a complementary metal oxide semiconductor (CMOS), and a fixed-focus imaging optical system, for example.

The mist filter 140 is provided between the imaging unit 130 and the head 120K at the last position in the direction of transport of the sheet of paper P, and captures ink mist by suctioning the air in the periphery of the image recording drum 110. In this way, by capturing the ink mist through suctioning air in the periphery to the image recording drum 110, it is possible to prevent ink mist from infiltrating into the imaging unit 130. Thereby, it is possible to prevent reading errors and the like from occurring.

The drum temperature adjustment unit 142 adjusts the temperature of the image recording drum 110 by blowing conditioned air onto the image recording drum 110. The drum temperature adjustment unit 142 is principally constituted by an air-conditioning unit (not shown in the drawing), and a duct 142a which blows the conditioned air supplied from the air-conditioning unit onto the circumferential surface of the image recording drum 110. The duct 142a adjusts the temperature of the image recording drum 110 by blowing conditioned air onto the region of the image recording drum 110 other than the transport region of the sheet of paper P.

In the present example, since the sheet of paper P is transported along the circular arc-shaped surface of substantially the upper half region of the image recording drum 110, the duct 142a adjusts the temperature of the image recording drum 110 by blowing conditioned air onto substantially the lower half region of the image recording drum 110. Specifically, a blowing port of the duct 142a is formed in a circular arc shape so as to cover substantially the lower half of the image recording drum 110, and is configured such that conditioned air strikes substantially the lower half region of the image recording drum 110.

Here, the temperature adjustment of the image recording drum 110 depends on the temperature of the heads 120C, 120M, 120Y, and 120K (in particular, the temperature of the nozzle surfaces) so as to be lower than the temperature of the heads 120C, 120M, 120Y, and 120K. Thereby, it is possible to prevent condensation from occurring on the heads 120C, 120M, 120Y, and 120K. Specifically, by making the temperature of the image recording drum 110 lower than the heads 120C, 120M, 120Y, and 120K, it is possible to induce condensation on the image recording drum, and it is possible to prevent condensation from occurring on the heads 120C, 120M, 120Y, and 120K (and in particular, on the nozzle surfaces thereof).

The image recording unit 100, which is configured as described above, sends the sheet of paper P, which is transferred from the transporting drum 20, to the image recording drum 110. The image recording drum 110 grips the leading end of the sheet of paper P, with the gripper 110A, and by rotating, transports the sheet of paper P. The sheet pressing roller 112 brings the sheet of paper P into tight contact with the circumferential surface of the image recording drum 110. Simultaneously with this, the sheet of paper P is suctioned from the suction holes of the image recording drum 110, and the sheet of paper P is thereby suctioned and held on the outer circumferential surface of the image recording drum 110.

The heads 120C, 120M, 120Y, and 120K eject liquid droplets of inks of the respective colors of C, M, Y, and K onto the recording surface of the sheet of paper P while the sheet of paper P passes positions where the sheet faces the heads 120C, 120M, 120Y, and 120K, thereby forming a color image on the recording surface.

The imaging unit 130 reads the image recorded on the recording surface of the sheet of paper P while the sheet of paper P passes positions where the sheet faces the heads. This reading from the recorded image is performed as necessary, and image defects such as streaks are detected from the read image. Thereby, inspection for a defective nozzle (an example of a defective recording element) such as a nozzle causing ink ejection failure or a nozzle causing misalignment in landing which causes image defects is performed. The reading is performed in a state where the sheet is suctioned and held on the image recording drum 110, and therefore it is possible to read the image with high accuracy. Further, since the image is read immediately after image recording, then it is possible to detect abnormalities of for example a nozzle causing ejection failure, a nozzle causing misalignment in landing, and the like, and thus it is possible to promptly cope with the abnormalities. Thereby, it is possible to prevent wasteful recording, as well as being able to minimize the occurrence of wasted sheets of paper.

Thereafter, the image recording drum 110 transfers the sheet of paper P to a transporting drum 30 after the suctioning of the sheet of paper P is released.

<Configuration Example of Ink Jet Head>

Next, the structure of inkjet heads will be described. The heads 120C, 120M, 120Y, and 120K corresponding to respective colors have the same structure, and typically the reference numeral 120 hereinafter indicates any of the heads.

Figure 2A:
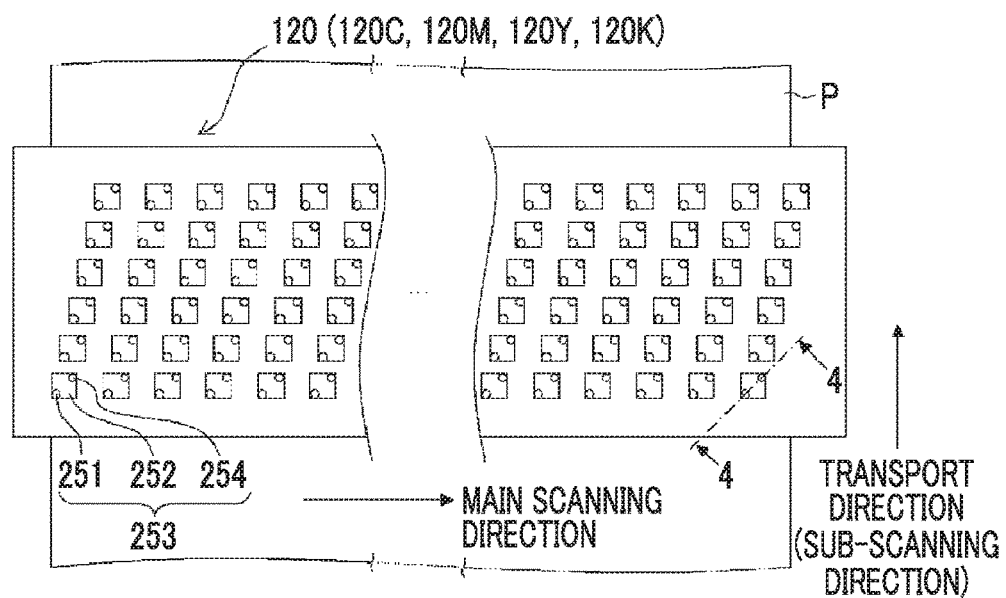
FIG. 2A is a perspective plan view illustrating a structure example of a head 120.
Figure 2B:
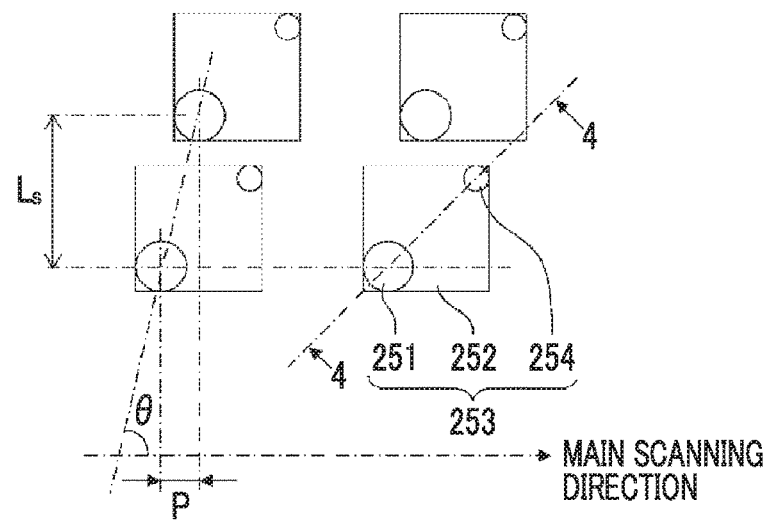
FIG. 2B is an enlarged view of a part thereof.

As shown in FIGS. 2A and 2B, the head 120 has a structure in which a plurality of ink chamber units (liquid droplet ejection elements) 253, each having a nozzle 251 (an example of the recording element) as an ink ejection port, a pressure chamber 252 corresponding to the nozzle 251, and the like, are arranged two-dimensionally in a matrix shape. Thereby, the effective nozzle interval (the projected nozzle pitch) projected (orthographically-projected) such that the nozzles are arranged in a direction (main scanning direction) perpendicular to the direction of transport of the sheet of paper P is reduced, and high nozzle density is achieved.

Figure 3A:
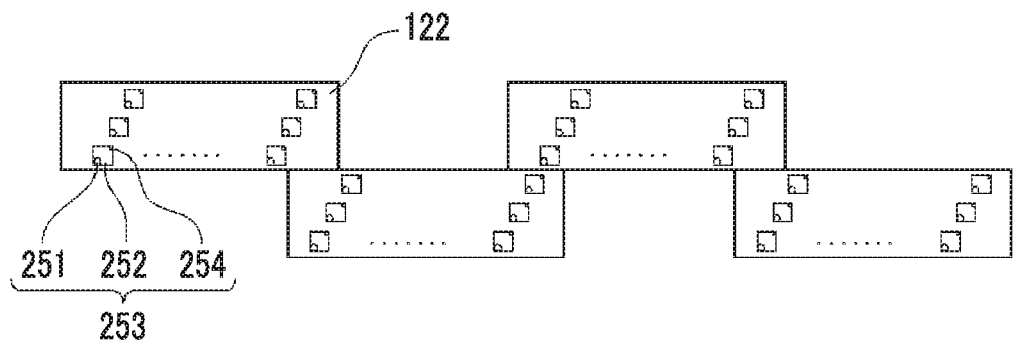
FIGS. 3A and 3B are perspective plan views illustrating other structure examples of the head 120.
Figure 3B:
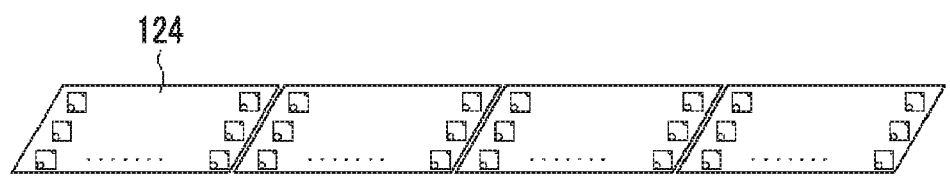

The form constituting a nozzle array of which a length is equal to or greater than a length corresponding to the entire width of the recording region of the sheet of paper P in the main scanning direction is not limited to the present example. For example, instead of the configuration in FIG. 2A, there may be the following configurations: a configuration in which a line head having a nozzle array having a length corresponding to the entire width of the sheet of paper P is formed by arranging, in a staggered matrix, and combining short head modules 122 having a plurality of nozzles 251 arranged in a two-dimensional fashion, as shown in FIG. 3A; and a configuration in which head modules 124 are lined up and combined as shown in FIG. 3B.

The invention is not limited to a case where the full surface of the sheet of paper P is set as a range of recording. In cases where a portion of the surface of the sheet of paper P is set as a range of recording (for example, a case where a non-recording region is provided in the periphery of the sheet of paper P, and the like), nozzle array required for recording in the predetermined recording region may be formed.

The pressure chamber 252 provided to each nozzle 251 has substantially a square planar shape (refer to FIGS. 2A and 2B), where an outlet port for the nozzle 251 is provided at one of both diagonally opposite corners, and an inlet port (supply port) 254 for receiving the supplied ink is provided at the other of the corners. The shape of the pressure chamber 252 is not limited to the present example, and the planar shape can be various shapes such as quadrangles (rhombus, rectangle, and the like), a pentagon, a hexagon, other polygons, a circle, and an ellipse.

Figure 4:
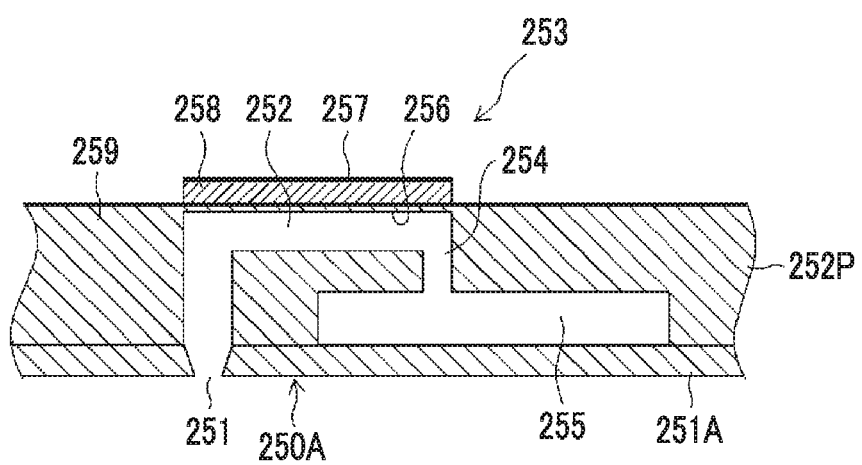
FIG. 4 is a cross-sectional view taken along the line 4-4 in FIG. 2.

As shown in FIG. 4, the head 120 is formed by laminating and joining together a nozzle plate 251A, in which the nozzles 251 are formed, a flow channel plate 252P, in which the pressure chambers 252 and the flow channels including a common flow channel 255 are formed, and the like. The nozzle plate 251A forms a nozzle surface (ink ejection surface) 250A of the head 120, where the nozzles 251 communicating respectively to the pressure chambers 252 are two-dimensionally arranged.

The flow channel plate 252P constitutes lateral side wall parts of the pressure chamber 252 and serves as a flow channel formation member, which forms the supply port 254 as a limiting part (the narrowest part) of the individual supply channel leading the ink from the common flow channel 255 to the pressure chamber 252. FIG. 4 is simplified for convenience of description, and the flow channel plate 252P may be structured by laminating one or more substrates.

The nozzle plate 251A and the flow channel plate 252P can be made of silicon and formed in the desired shapes by means of the semiconductor manufacturing process.

The common flow channel 255 communicates with an ink tank (not shown in the drawing), which is an ink supply source, and the ink supplied from the ink tank is delivered through the common flow channel 255 to the pressure chambers 252.

A piezoelectric actuator 258 having an individual electrode 257 is connected to an oscillating plate 256 constituting a part of faces (the ceiling face in FIG. 4) of the pressure chamber 252. The oscillating plate 256 of the present example is made of silicon (Si) which has a nickel (Ni) conductive layer functioning as a common electrode 259 corresponding to lower electrodes of piezoelectric actuators 258, and also serves as the common electrode of the piezoelectric actuators 258 which are disposed to correspond to the respective pressure chambers 252. The oscillating plate 256 can be formed by a non-conductive material such as resin. In this case, a common electrode layer made of a conductive material such as metal is formed on the surface of the oscillating plate member. Further, the oscillating plate, which also serves as the common electrode, may be made of metal (an electrically-conductive material) such as stainless steel (SUS).

By applying a drive voltage to the individual electrode 257, the piezoelectric actuator 258 is deformed, the volume of the pressure chamber 252 is thereby changed, and the ink is ejected through the nozzle 251 due to change in pressure according to the change in volume. When the displacement of the piezoelectric actuator 258 is returned to its original state after the ink is ejected, the pressure chamber 252 is refilled with new ink supplied from the common flow channel 255 through the supply port 254.

As shown in FIG. 2B, the multiple ink chamber units 253 having the above-described structure are arranged in a lattice shape with a predetermined array pattern in a row direction along the main scanning direction and a column direction which is not perpendicular to and is oblique at an angle of θ to the main scanning direction, and thereby the high density nozzle head of the present example is formed. In this matrix array, the nozzles 251 can be regarded to be equivalent to those substantially arranged linearly at a certain pitch P=Ls/tan θ in the main scanning direction, in a case where Ls is a distance between the nozzles adjacent in the sub-scanning direction (the direction of transport of the sheet of paper P).

In implementing the present invention, the form of the array of the nozzles 251 in the head 120 is not limited to the examples in the drawings, and various nozzle array structures can be employed. For example, instead of the matrix array as described in FIGS. 2A and 2B, it is also possible to use a nozzle array having a V-shape or a nozzle array having a broken-line shape such as a zigzag shape (W-shape or the like) which repeats units of V-shaped nozzle arrays.

The means for generating pressure (ejection energy) for ejection applied to eject liquid droplets from the nozzles in the ink jet head is not limited to the piezoelectric actuator (piezoelectric elements), and can employ various pressure generation elements (energy generation elements), such as heaters (heating elements) in a thermal system (which uses the pressure resulting from film boiling by the heat of the heaters to eject ink) and various actuators in other systems. According to the ejection system of the head, the corresponding energy generation elements are arranged in the flow channel structure body.

<Configuration of Control System>

Figure 5:
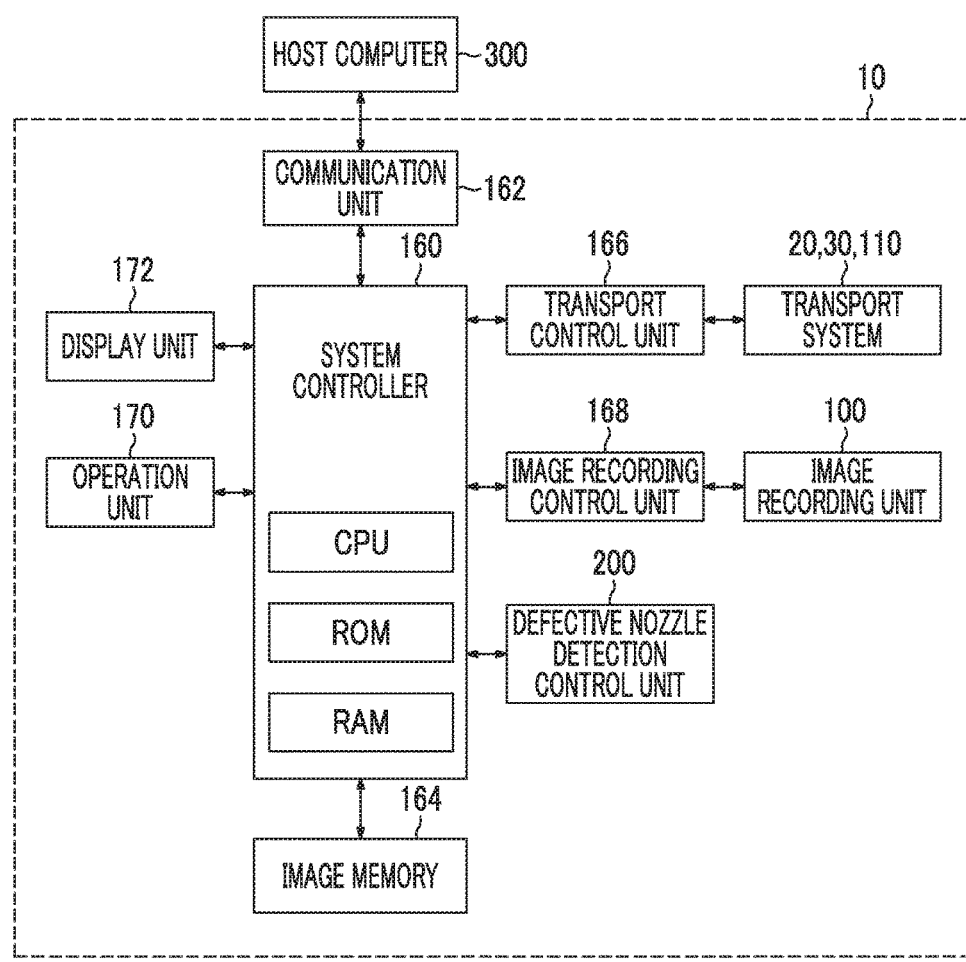
FIG. 5 is a block diagram illustrating a schematic configuration of a control system of an ink jet recording apparatus 10.

As shown in FIG. 5, the ink jet recording apparatus 10 comprises a system controller 160, a communication unit 162, an image memory 164, a transport control unit 166, an image recording control unit 168, an operation unit 170, a display unit 172, a defective nozzle detection control unit 200, and the like.

The system controller 160 functions as a control unit for performing overall control of the respective units of the ink jet recording apparatus 10, and also functions as a calculation unit for performing various calculation processes. This system controller 160 comprises a central processing unit (CPU), a read only memory (ROM), a random access memory (RAM), and the like, and operates in accordance with a predetermined control program. A control program, which is executed by the system controller 160, and various data required for control are stored in the ROM.

The communication unit 162 comprises a desired communication interface, and sends and receives data between the communication interface and a connected host computer 300.

The image memory 164 functions as a temporary storage unit for various data including image data, and data is read from and written to the memory through the system controller 160. Image data, which is received from the host computer 300 through the communication unit 162, is stored in the image memory 164.

The transport control unit 166 controls the transport system for the sheet of paper P in the ink jet recording apparatus 10. That is, the transport control unit 166 controls not only driving of the image recording drum 110 in the image recording unit 100, but also driving of the transporting drum 20 and driving of the transporting drum 30.

The transport control unit 166 controls the transport system in accordance with an instruction from the system controller 160 such that the sheet of paper P is transported without delay.

The image recording control unit 168 controls the image recording unit 100 in accordance with the instruction from the system controller 160. Specifically, the driving of the heads 120C, 120M, 120Y, and 120K (refer to FIG. 1) is controlled such that a predetermined image is recorded on the sheet of paper P transported by the image recording drum 110.

The operation unit 170 is an input unit comprising operating buttons, a keyboard, a touch panel, and the like. A user is able to input a print job for the ink jet recording apparatus 10 through the operation unit 170. Here, the print job indicates a processing unit of one work of printing based on the image data. The operation unit 170 outputs the input print job to the system controller 160. The system controller 160 executes various processing in accordance with the print job which is input from the operation unit 170.

The display unit 172 comprises a display device such as a liquid crystal display (LCD) panel, and causes necessary information to be displayed on the display device in accordance with an instruction from the system controller 160.

The defective nozzle detection control unit 200 will be hereinafter described.

As described above, image data to be recorded on the sheet of paper P is received in the ink jet recording apparatus 10 from the host computer 300 through the communication unit 162. The received image data is stored in the image memory 164.

The system controller 160 generates dot data by performing desired signal processing on the image data stored in the image memory 164. The image recording control unit 168 then controls the driving of the heads 120C, 120M, 120Y, and 120K of the image recording unit 100 in accordance with the generated dot data, so as to record an image represented by the image data, on the recording surface of the sheet of paper P.

In general, the dot data is generated by performing color conversion processing and halftone processing on the image data. The color conversion processing is processing for converting image data represented by sRGB, or the like (for example, RGB 8-bit image data) into ink amount data for each color of ink used by the ink jet recording apparatus 10 (in the present example, ink amount data for the respective colors of C, M, Y, and K). Halftone processing is processing for converting the ink amount data of the respective colors generated by the color conversion processing into dot data of respective colors by error diffusion processing, or the like.

The system controller 160 generates dot data of the respective colors by performing color conversion processing and halftone processing on the image data. Then, the image recording control unit 168 controls the driving of the corresponding heads 120C, 120M, 120Y, and 120K in accordance with the dot data for the respective colors generated, thereby recording an image, which is represented by the image data, on the sheet of paper P.

<Configuration of Defective Nozzle Detection Control Unit>

Figure 6:
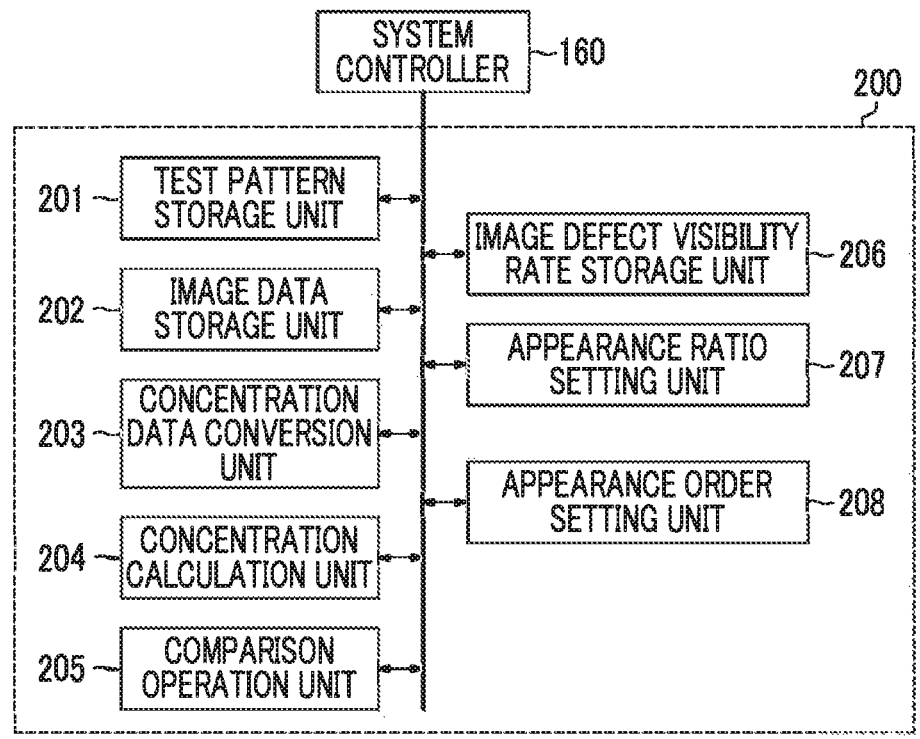
FIG. 6 is a block diagram illustrating an internal configuration of a defective nozzle detection control unit 200.

The defective nozzle detection control unit 200 comprises, as shown in FIG. 6, a test pattern storage unit 201, an image data storage unit 202, a density data conversion unit 203, a density calculation unit 204, a comparison operation unit 205, an image defect visibility rate storage unit 206, an appearance ratio setting unit 207, an appearance order setting unit 208, and the like.

The test pattern storage unit 201 stores test patterns for detecting a defective nozzle according to the present embodiment. The test pattern storage unit 201 sends data of a selected test pattern to the image recording control unit 168 on the basis of an instruction from the system controller 160. The image recording control unit 168 controls driving of the heads 120C, 120M, 120Y, and 120K, and outputs the test pattern to the recording surface of the sheet of paper P. In other words, the image recording control unit 168 functions as a recording unit for recording the test pattern on the recording surface of the sheet of paper P.

Figure 7:
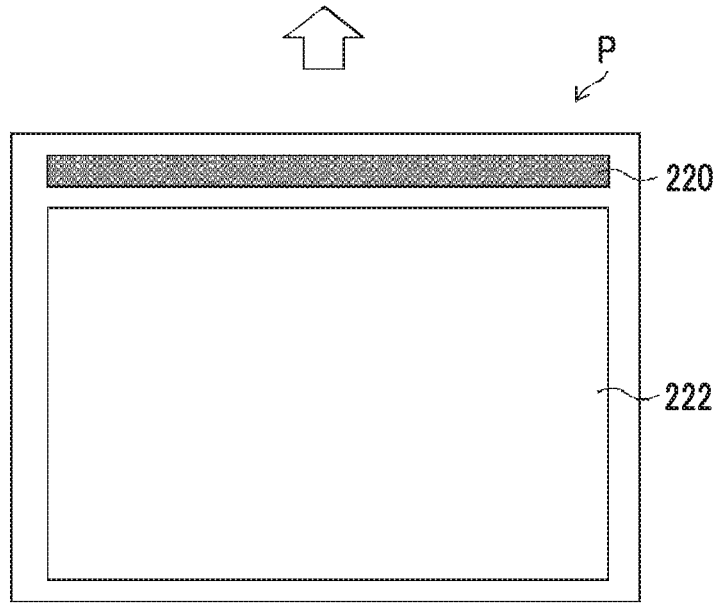
FIG. 7 is a top plan view of a recording surface of a sheet of paper P, and is a diagram illustrating a test pattern recording region 220, which is a region in which a test pattern is recorded, and an image recording region 222 which is a region in which an output image is recorded.

In the present embodiment, the test pattern for defective nozzle detection is recorded by one recording head in a predetermined region other than the output image region when the output image (main image) is recorded. As shown in FIG. 7, the test pattern recording region 220, in which the test pattern is recorded, is provided with a width corresponding to the nozzle array of the heads 120, on the upstream side of the output image recording region 222 in the direction of transport of the sheet of paper P. The test pattern recording region 220 may be disposed on the downstream side of the output image recording region 222 in the direction of transport of the sheet of paper P. Further, it is also possible to adopt a configuration in which, rather than providing a test pattern recording region 220 and an output image recording region 222 on the same sheet of paper P, a test pattern recording region 220 is provided over the entire surface of one sheet of paper P.

In the test pattern recording region 220, the test pattern is recorded through a predetermined length in the direction of transport of the sheet of paper P, by ejecting ink from all the nozzles in any one head of the heads 120C, 120M, 120Y, and 120K continuously for a predetermined time period.

The length of the test pattern in the transport direction is set in view of the reading speed based on the resolution of the imaging elements, in other words, the transport speed of the sheet of paper P, such that an image of the region from the leading end to the trailing end of the test pattern is captured completely and clearly, at the time of imaging performed by the imaging unit 130. Here, a test pattern of one color is recorded on one sheet of paper P, but test patterns of a plurality of colors may be recorded.

Returning to the description of FIG. 6, an image of the test pattern, which is recorded on the sheet of paper P by the image recording unit 100, is captured by the imaging unit 130 (refer to FIG. 1), and is stored as inspection image data in the image data storage unit 202.

The density data conversion unit 203 reads the inspection image data from the image data storage unit 202, converts the data into density data, and splits the data into density data for each pixel column. The density data for each pixel column corresponds to the density characteristics (density data) for each of the nozzles which form the pixel columns.

The density calculation unit 204 calculates an average value of the density data for each pixel column from the density data for each pixel column which is obtained by the density data conversion unit 203.

The comparison operation unit 205 compares the average value of the density data for each pixel column calculated by the density calculation unit 204 with a preset density threshold value. In a case where the average value of the density data is lower (weaker) than the density threshold value, it is determined that the nozzle corresponding to the pixel column is the nozzle causing ink ejection failure or the nozzle causing misalignment in landing. On the other hand, in a case where the average value of the density data is higher (darker) than the density threshold value, it is determined that the nozzle corresponding to the pixel column is a normal nozzle. In such a manner, the comparison operation unit 205 functions as a test pattern analysis unit for detecting a defective nozzle in the recording head.

The image defect visibility rate storage unit 206 (an example of a storage unit) stores an image defect visibility rate of each ink color. The image defect visibility rate is an example of an indicator which relatively indicates how easily image defects are visually perceived for each ink color.

Among the colors of the inks for recording an image, there are colors, in which image defects such as streaks are likely to be visually perceived by human eyes, and colors in which image defects are unlikely to be visually perceived. The characteristics of each ink color are herein defined as characteristics as to how easily image defects are visually perceived for each ink color. Further, the indicator, which relatively indicates how easily image defects are visually perceived for each ink color, indicates how easily image defects are visually perceived for each ink color, as a proportion for each ink color. Regarding the indicator which relatively indicates how easily image defects are visually perceived for each ink color, the indicator of the ink of the color, in which image defects are likely to be visually perceived, is set to be high, and the indicator of the ink of the color, in which image defects are unlikely to be visually perceived, is set to be low. For example, the indicator of a black ink is highest, and the indicators of magenta, cyan, and yellow inks are set to sequentially decrease in this order.

In the present embodiment, an image defect visibility rate of each ink color is used as the indicator which relatively indicates how easily image defects are visually perceived for each ink color. The image defect visibility rate of each ink color is a rate of the number of image defects which are visually perceived when the same image is recorded for each ink color and a person views the image for each color, and is set in advance in the following manner (an example of an image defect visibility rate setting step).

By using the sheet of paper P and the head 120 used in the image recording unit 100, all the nozzles 251 records an image (density image sample) having a uniform density on the sheet of paper P. The density image sample is, for example, a density patch of 50 [mm]×50 [mm], and is recorded at a thickest density used in recording without correction such as unevenness correction. As the sheet of paper P, a sheet of paper, which has the same type as the sheet of paper used in the image recording, is used.

Then, streaks present in the recorded density image sample are visually detected, and the number of streaks is counted. The same head 120 is used if possible, ink is exchanged, the density image sample of each color ink is recorded, and the number of streaks of the density image sample of each color is counted. In this case, a reference when the streaks are determined is the same reference in each color density image sample.

Assuming that the numbers of streaks detected in the density image samples of cyan, magenta, yellow, and black inks are respectively $L(C)$, $L(M)$, $L(Y)$, and $L(K)$, image defect visibility rates $s(C)$, $s(M)$, $s(Y)$, and $s(K)$ of the respective color inks can be respectively calculated as follows.

$$s(C)=L(C)/(L(C)+L(M)+L(Y)+L(K)) \quad \text{(Expression 1)}$$

$$s(M)=L(M)/(L(C)+L(M)+L(Y)+L(K)) \quad \text{(Expression 2)}$$

$$s(Y)=L(Y)/(L(C)+L(M)+L(Y)+L(K)) \quad \text{(Expression 3)}$$

$$s(K)=L(K)/(L(C)+L(M)+L(Y)+L(K)) \quad \text{(Expression 4)}$$

Consequently, the image defect visibility rate of each color satisfies the following relation.

$$s(C)+s(M)+s(Y)+s(K)=1 \quad \text{(Expression 5)}$$

For example, in a case where the numbers of streaks detected are $L(C)=2$, $L(M)=2$, $L(Y)=1$, and $L(K)=5$, the image defect visibility rates are $s(C)=0.2$, $s(M)=0.2$, $s(Y)=0.1$, and $s(K)=0.5$. In such a manner, as the number of streaks as image defects in the ink of the color is larger, the image defect visibility rate is set to be higher.

Generally, in the black ink, streaks are most likely to be visually perceived, and in the ink of a color other than black, streaks are less likely to be visually perceived. Since the value of visibility becomes different in accordance with the type of the paper or the ink, it is preferable that the value is set in accordance with the type of the paper used for print or ink.

The image defect visibility rates, which are set as described above, are stored in the image defect visibility rate storage unit 206.

The appearance ratio setting unit 207 (an example of an appearance ratio setting unit) sets appearance ratios of the test patterns recorded by the heads 120C, 120M, 120Y, and 120K, on the basis of the image defect visibility rates which are read from the image defect visibility rate storage unit 206. The appearance order setting unit 208 sets an order of appearance of the test patterns recorded by the heads 120C, 120M, 120Y, and 120K, on the basis of the appearance ratios which are set in the appearance ratio setting unit 207.

<Image Recording Operation>

Figure 8:
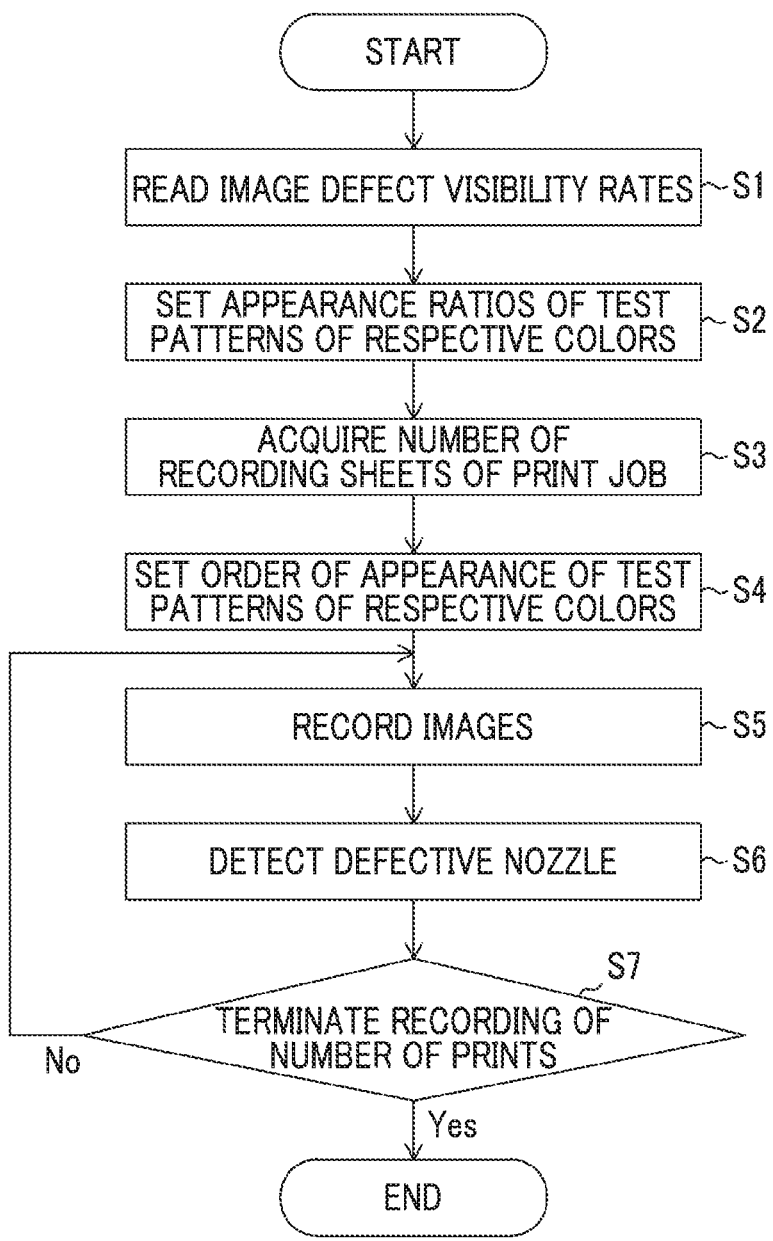
FIG. 8 is a flowchart illustrating an image recording operation of the ink jet recording apparatus 10.

Next, an image recording operation (an example of the method of detecting a defective recording element in the recording head) of the ink jet recording apparatus 10 will be described with reference to the flowchart of FIG. 8. The ink jet recording apparatus 10 performs image recording of an image, which is designated by the print job, on a designated number of sheets. In this case, the designated image is recorded in the image recording region 222, and the test pattern for defective nozzle detection is recorded in the test pattern recording region 220. The test pattern is recorded by any one head of the heads 120C, 120M, 120Y, and 120K. By analyzing the test pattern for defective nozzle detection, a defective nozzle is detected.

(Step S1)

If the print job is input, the appearance ratio setting unit 207 (an example of an indicator acquisition unit) reads the image defect visibility rates $s(C)$, $s(M)$, $s(Y)$, and $s(K)$ of the respective color inks of cyan, magenta, yellow, and black from the image defect visibility rate storage unit 206 (an example of an indicator acquisition step).

(Step S2)

Next, the appearance ratio setting unit 207 sets appearance ratios $A(C)$, $A(M)$, $A(Y)$, and $A(K)$ of the test patterns, which are respectively recorded by the heads 120C, 120M, 120Y, and 120K, on the basis of the image defect visibility rates $s(C)$, $s(M)$, $s(Y)$, and $s(K)$ which are read from the image defect visibility rate storage unit 206 (an example of an appearance ratio setting step).

The appearance ratio setting unit 207 sets a higher appearance ratio as the image defect visibility rate of each color becomes higher. Here, the appearance ratios $A(C)$, $A(M)$, $A(Y)$, and $A(K)$ of the respective colors are set to be equal to values of the image defect visibility rates $s(C)$, $s(M)$, $s(Y)$, and $s(K)$. For example, in a case of $s(C)=0.2$, $s(M)=0.2$, $s(Y)=0.1$, and $s(K)=0.5$, the following results are obtained: $A(C)=0.2$, $A(M)=0.2$, $A(Y)=0.1$, and $A(K)=0.5$.

(Step S3)

Next, the appearance order setting unit 208 acquires the number of prints j which is designated in the print job.

(Step S4)

Further, the appearance order setting unit 208 sets the order of appearance of the test patterns of each color, on the basis of the number of prints j which is acquired in step S3 and the appearance ratios $A(C)$, $A(M)$, $A(Y)$, and $A(K)$ which are set in step S2. That is, respective colors of the 1st to j-th test patterns recorded on the 1st to j-th sheets of paper P are set.

In this case, the appearance order setting unit 208 sets a test pattern, which is recorded first, as a test pattern having a color of which the appearance ratio is highest, and sets an order in which the following test patterns of the respective colors are distributed in accordance with the appearance ratios.

For example, assuming that the appearance ratios of the respective colors are $A(C)=0.2$, $A(M)=0.2$, $A(Y)=0.1$, and $A(K)=0.5$ and an n-th test pattern is $T(n)$, an order up to $T(j)$ is set as follows. $T(1)$=black, $T(2)$=cyan, $T(3)$=black, $T(4)$=magenta, $T(5)$=black, $T(6)$=yellow, $T(7)$=black, $T(8)$=cyan, $T(9)$=black, $T(10)$=magenta, ... $T(j)$.

The appearance order setting unit 208 may cause all the heads 120C, 120M, 120Y, and 120K to first record a test pattern, one color at a time, and may set an order in which the following test patterns of the respective colors are distributed in accordance with the appearance ratios. That is, assuming that the number of heads is i and the number of test patterns to be recorded is j, the appearance order setting unit 208 may cause i heads to record i test patterns to be recorded on first i sheets of paper P one by one, and may set the order of appearance of the test patterns of each color so as to record the remaining (j−i) test patterns at the appearance ratios each of which is set for each color.

As described above, at the beginning of the print job, the order of appearance is set such that all the heads roughly record the test patterns, whereby it is possible to perform defective nozzle detection on heads having low image defect visibility rates even at an early stage. Therefore, it is possible to detect a defective nozzle early in a case where the defective nozzle is present.

(Step S5)

The image recording control unit 168 controls driving of the heads 120C, 120M, 120Y, and 120K such that the heads record the test patterns stored in the test pattern storage unit 201 in the test pattern recording region 220 and record a designated image in the image recording region 222 on the basis of the print job (an example of a recording step) on the number of sheets of paper P designated by the print job. In this case, the image recording control unit 168 performs recording in the order which is set by the appearance order setting unit 208.

For example, in a case of T(1)=black, T(2)=cyan, T(3)=black, and T(4)=magenta, the image recording control unit 168 causes the head 120K to record a test pattern in the test pattern recording region 220 on the first sheet of paper P, causes the head 120C to record a test pattern in the test pattern recording region 220 on the second sheet of paper P, causes the head 120K to record a test pattern in the test pattern recording region 220 on the third sheet of paper P, and causes the head 120M to record a test pattern in the test pattern recording region 220 on the fourth sheet of paper P.

(Step S6)

The imaging unit 130 captures images of the test patterns recorded in the test pattern recording region 220, thereby generating inspection image data (an example of an imaging step). The density data conversion unit 203 converts the inspection image data into density data of each pixel column, and the density calculation unit 204 calculates an average value for each pixel column. The comparison operation unit 205 compares the average value with a density threshold value for each pixel column, thereby detecting a defective nozzle (an example of an analysis step).

(Step S7)

It is determined whether or not recording of the number of prints j designated by the print job is terminated. In a case where the recording is not terminated, the process returns to step S5, the image recording is continued. In a case where the recording is terminated, the image recording is terminated.

As described above, if the image recording is performed on the j sheets of paper P designated by the print job, the j test patterns are recorded simultaneously. The heads 120C, 120M, 120Y, and 120K of the respective colors record the j test patterns at the appearance ratios A(C), A(M), A(Y), and A(K) corresponding to the image defect visibility rates s(C), s(M), s(Y), and s(K). Therefore, defective nozzle detection of the heads 120C, 120M, 120Y, and 120K of the respective colors is performed at proportions the same as the appearance ratios A(C), A(M), A(Y), and A(K).

As described above, defective nozzle detection of the heads 120C, 120M, 120Y, and 120K of the respective colors is performed at proportions corresponding to the image defect visibility rates s(C), s(M), s(Y), and s(K). Therefore, it is possible to increase a frequency of defective nozzle detection for a recording head of a color, in which image defects are easily visually perceived, among the plurality of recording heads. As a result, it is possible to efficiently detect a defective nozzle.

In the present embodiment, the appearance ratios A(C), A(M), A(Y), and A(K) of the respective colors are set to be equal to values of the image defect visibility rates s(C), s(M), s(Y), and s(K), but may be different values.

A color, in which the image defect visibility rate is less than a certain reference (an example of the threshold value), is regarded as less causing a problem in image quality, compared with another color. In order to exclude the color from the defective nozzle detection, the appearance ratio setting unit 207 may set the appearance ratio of the color to 0. For example, a color, in which the image defect visibility rate is equal to or less than 0.1 (equal to or less than 10%), is regarded as not causing a problem in image quality. In a case where the image defect visibility rates of the present embodiment are s(C)=0.2, s(M)=0.2, s(Y)=0.1, and s(K)=0.5, the image defect visibility rate of yellow is equal to or less than a half of that of another color, and is equal to or less than 0.1. Accordingly, it is possible to exclude the head 120Y from the defective nozzle detection. In this case, the appearance ratio of yellow is set as A(Y)=0, and a coefficient B is determined to satisfy the following expression.

$(s(C)+s(M)+s(K))\cdot B=1$  (Expression 6)

Here, B=1.1 is set, the appearance ratios of the respective colors are A(C)=s(C)·B=0.22, A(M)=s(M)·B=0.22, A(Y)=0, and A(K)=s(K)·B=0.56.

At the beginning of the print job, by setting the order of appearance in which the test patterns are roughly recorded by all the heads, it is also possible to perform defective nozzle detection for the head 120Y in this order.

How easily image defects in the recorded image are visually perceived depends on a density. Thus, as the density becomes thicker, the image defects are more easily visually perceived. Further, the image defect visibility rates s(C), s(M), s(Y), and s(K) depend on a density of a density image sample used at the time of the setting. Accordingly, it is preferable that the ink jet recording apparatus 10 determines an appropriate density such as an average density from the recorded image at the time of the image recording operation, and it is preferable that the image defect visibility rate at the determined density is used. In this case, the image defect visibility rate may be obtained for each of a plurality of different densities in advance, and the obtained image defect visibility rate may be stored as an image defect visibility rate of each color corresponding to the density in the image defect visibility rate storage unit 206.

For example, by using the density image samples of which densities are respectively 20%, 40%, 60%, and 80%, the image defect visibility rates s(C), s(M), s(Y), and s(K) at each density are determined. In this case, as the density increases, the number of streaks, which are detected from each density image sample, increases. That is, in an order of a larger numbers of streaks, the density image samples having densities of 80%, 60%, 40%, and 20% are arranged. The determined image defect visibility rates s(C), s(M), s(Y), and s(K) at each density are stored in the image defect visibility rate storage unit 206 (an example of a storage unit for storing indicators corresponding to the densities).

The appearance ratio setting unit 207 calculates the average density from the recorded image, and among the densities 20%, 40%/c, 60%, and 80%, a density, which is most approximate to the calculated average density, is determined. Further, the appearance ratio setting unit 207 reads the image defect visibility rates s(C), s(M), s(Y), and s(K) at the determined density from the image defect visibility rate storage unit 206, and sets the appearance ratios of the test patterns, which are recorded by the respective heads 120C, 120M, 120Y, and 120K, on the basis of the read image defect visibility rates (an example of an indicator acquisition unit for acquiring indicators corresponding to the density of the recorded image). As described above, the indicator, which relatively indicates how easily image defects are visually perceived for each ink color at the density, is stored, and the appearance ratios of the test patterns are set using the indicators corresponding to the density of the recorded image. Regarding the indicator which relatively indicates how easily image defects are visually perceived for each color at the density, the indicator of black ink is set as a highest value regardless of the density, and the following indicators are set to become lower in an order of magenta, cyan, and yellow.

<Second Embodiment>

An ink jet recording apparatus according to a second embodiment will be described. It should be noted that components the same as those of the ink jet recording apparatus 10 according to the first embodiment are represented by the same reference signs and numerals, and a detailed description thereof will be omitted. In the second embodiment, an occurrence proportion of streaks is used as the indicator which relatively indicates how easily image defects are visually perceived for each ink color.

Figure 9:
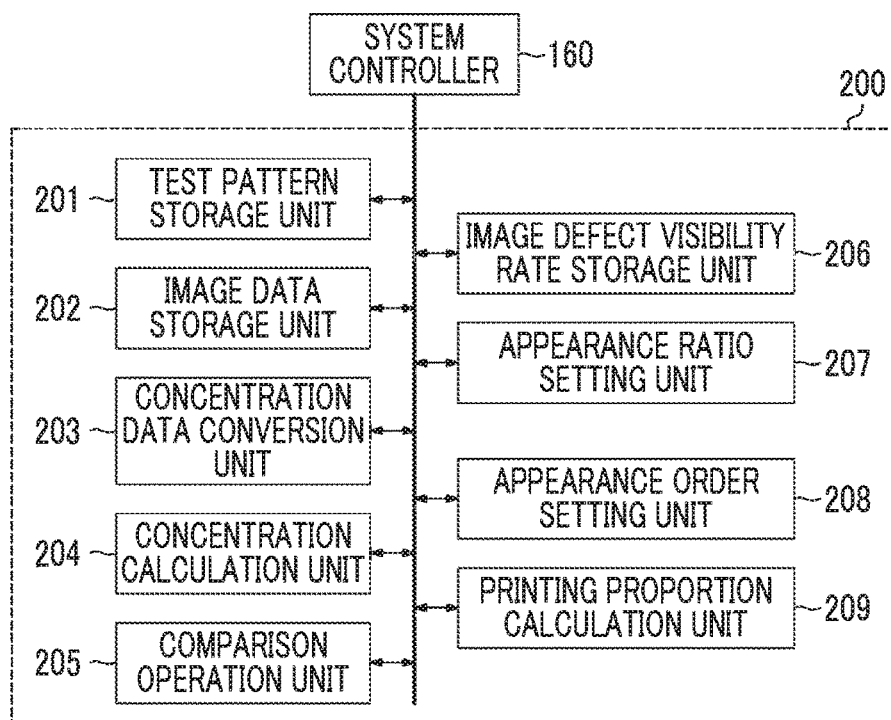
FIG. 9 is a block diagram illustrating an internal configuration of the defective nozzle detection control unit 200 according to a second embodiment.

The defective nozzle detection control unit 200 according to the second embodiment comprises, as shown in FIG. 9, a printing proportion calculation unit 209. The printing proportion calculation unit 209 functions as a printing proportion acquisition unit for calculating a printing proportion of the recorded image designated by the print job. Here, the printing proportion is defined as a proportion of an amount of the ejected ink of each color (amount of ink) ejected from each of the heads 120C, 120M, 120Y, and 120K when the recorded image is recorded on a single recording medium.

Assuming that the amounts of inks of cyan, magenta, yellow, and black obtained when the recorded image is recorded on a single recording medium are respectively V(C), V(M), V(Y), and V(K), printing proportions r(C), r(M), r(Y), and r(K) of the respective colors can be respectively represented by the following expressions.

$$r(C)=V(C)/[V(C)+V(M)+V(Y)+V(K)] \quad \text{(Expression 7)}$$

$$r(M)=V(M)/[V(C)+V(M)+V(Y)+V(K)] \quad \text{(Expression 8)}$$

$$r(Y)=V(Y)/[V(C)+V(M)+V(Y)+V(K)] \quad \text{(Expression 9)}$$

$$r(K)=V(K)/[V(C)+V(M)+V(Y)+V(K)] \quad \text{(Expression 10)}$$

Further, the printing proportions of the respective colors satisfy the following relationship.

$$r(C)+r(M)+r(Y)+r(K)=1 \quad \text{(Expression 11)}$$

For example, in a case where the amounts of inks per one sheet of the recording medium obtained when a certain image is recorded are V(C)=0.3 [ml], V(M)=0.3 [ml], V(Y)=0.1 [ml], and V(K)=0.3 [ml], the printing proportions are r(C)=0.3, r(M)=0.3, r(Y)=0.1, and r(K)=0.3.

<Image Recording Operation>

Figure 10:
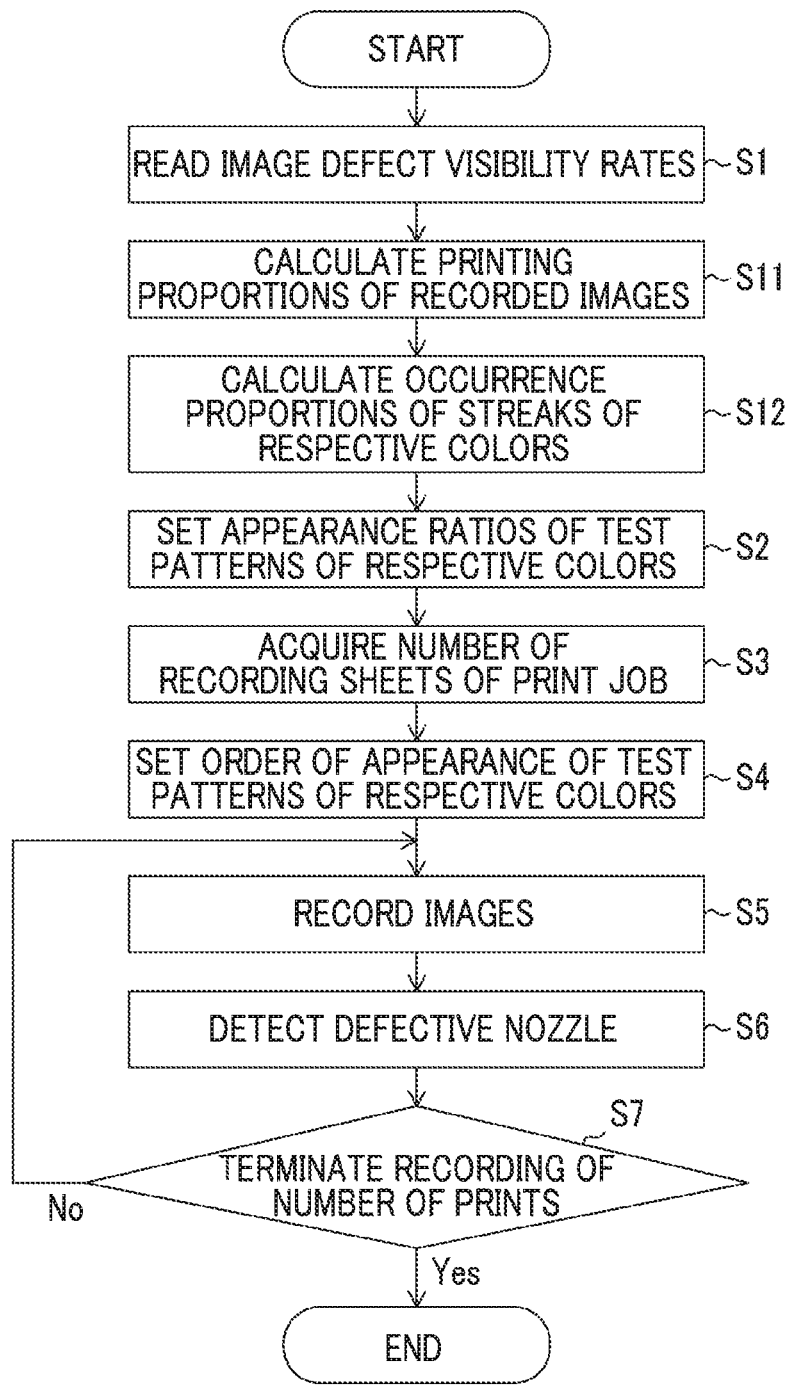
FIG. 10 is a flowchart illustrating an image recording operation of the ink jet recording apparatus 10 according to the second embodiment.

Next, an image recording operation of the ink jet recording apparatus 10 according to the second embodiment will be described with reference to the flowchart of FIG. 10. It should be noted that components the same as those of the flowchart of FIG. 8 are represented by the same reference signs and numerals, and a detailed description thereof will be omitted.

(Step S1)

The appearance ratio setting unit 207 reads the image defect visibility rates of the respective color inks from the image defect visibility rate storage unit 206. Here, it is assumed that the read image defect visibility rates of the respective colors are s(C)=0.2, s(M)=0.2, s(Y)=0.1, and s(K)=0.5.

(Step S11)

The printing proportion calculation unit 209 acquires the recorded image of the print job, and calculates printing proportions of the recorded image. Here, for example, it is assumed that the calculated printing proportions are r(C)=0.3, r(M)=0.3, r(Y)=0.1, and r(K=0.3.

(Step S12)

Next, the appearance ratio setting unit 207 calculates occurrence proportions of streaks F(C), F(M), F(Y), and F(K) of the respective colors, on the basis of the image defect visibility rates, which are read from the image defect visibility rate storage unit 206, and the printing proportions which are calculated by the printing proportion calculation unit 209. Here, the occurrence proportions of streaks F(C), F(M), F(Y), and F(K) of the respective colors are calculated by using the following expressions.

$$F(C)=r(C)\cdot s(C)/[r(C)\cdot s(C)+r(M)\cdot s(M)r(Y)\cdot s(Y)+r(K)\cdot s(K)] \quad \text{(Expression 12)}$$

$$F(M)=r(M)\cdot s(M)/[r(C)\cdot s(C)+r(M)\cdot s(M)+r(Y)\cdot s(Y)+r(K)\cdot s(K)] \quad \text{(Expression 13)}$$

$$F(Y)=r(Y)\cdot s(Y)/[r(C)\cdot s(C)+r(M)\cdot s(M)+r(Y)\cdot s(Y)+r(K)\cdot s(K)] \quad \text{(Expression 14)}$$

$$F(K)=r(K)\cdot s(K)/[r(C)\cdot s(C)+r(M)\cdot s(M)+r(Y)\cdot s(Y)+r(K)\cdot s(K)] \quad \text{(Expression 15)}$$

Consequently, the occurrence proportions of streaks of the respective colors satisfy the following relationship.

$$F(C)+F(M)+F(Y)+F(K)=1 \quad \text{(Expression 16)}$$

In a case of the present embodiment, the occurrence proportions of streaks of the respective colors are F(C)=0.21, F(M)=0.21, F(Y)=0.04, and F(K)=0.54.

(Step S2)

Next, the appearance ratio setting unit 207 sets the appearance ratios of the test patterns A(C), A(M), A(Y), and A(K) which are respectively recorded by the heads 120C, 120M, 120Y, and 120K, on the basis of the occurrence proportions of streaks of the respective colors.

The appearance ratio setting unit 207 sets an appearance ratio as a higher value as the occurrence proportion of streaks of each color becomes higher. Further, the appearance ratio may be set as a higher value as the printing proportion of each color becomes higher. Here, the appearance ratios A(C), A(M), A(Y), and A(K) of the respective colors are set to be equal to the occurrence proportions of streaks F(C), F(M), F(Y), and F(K). Consequently, the appearance ratios of the respective colors are A(C)=0.21, A(M)=0.21, A(Y)=0.04, and A(K)=0.54.

Hereinafter, the process from step S3 may be performed in a manner similar to the first embodiment.

As described above, as the indicators each of which relatively indicates how easily image defects are visually perceived for each ink color, the occurrence proportions of streaks, which are products between the image defect visibility rates s(C), s(M), s(Y), and s(K) and the printing proportions r(C), r(M), r(Y), and r(K), are used, and defective nozzle detection for the heads 120C, 120M, 120Y, and 120K of the respective colors is performed at proportions corresponding to the occurrence proportions of streaks. Therefore, it is possible to increase a frequency of defective nozzle detection of the recording head of a color, in which image defects easily occur, among the plurality of recording heads.

The appearance ratio setting unit 207 may set an appearance ratio of a color, in which the occurrence proportion of streaks (an example of a product proportion of the indicator and the printing proportion) is less than a certain reference (an example of the threshold value), to 0. For example, the appearance ratio of the color, in which the occurrence proportion of streaks is equal to or less than 0.1, can be set to 0. In a case where the occurrence proportions of streaks of the present embodiment are F(C)=0.21, F(M)=0.21, F(Y)=0.04, and F(K)=0.54, the occurrence proportion of streaks of yellow F(Y)=0.04 is equal to or less than 1/5 of those of the other colors and is equal to or less than 0.1, and can be excluded from the defective nozzle detection. In this case, assuming that the occurrence proportion of streaks of yellow is F(Y)=0, the coefficient B is determined to satisfy the following expression.

$$(F(C)+F(M)+F(K))\cdot B=1 \quad\quad \text{(Expression 17)}$$

A value, which is obtained by multiplying the occurrence proportion of streaks by the coefficient B, may be set as the appearance ratio.

In the present embodiment, B=1.04 is set, and the appearance ratios of the respective colors are A(C)=F(C)·B=0.22, A(M)=F(M)·B=0.22, A(Y)=0, and A(K)=F(K)·B=0.56.

An appearance ratio of a color, of which the printing proportion is less than a predetermined threshold value, may be set to 0. For example, an appearance ratio of a color, of which the printing proportion is equal to or less than 0.1, can be set to 0.

Further, in the present embodiment, the printing proportion is defined as a proportion of an amount of the ejected ink of each color, but may be defined as a different proportion. For example, the printing proportion can be defined as a proportion of the number (the numbers of pixels) of ejection operations of the ink of each color ejected from each of the heads 120C, 120M, 120Y, and 120K when the recorded image is recorded on a single recording medium.

Figure 11:
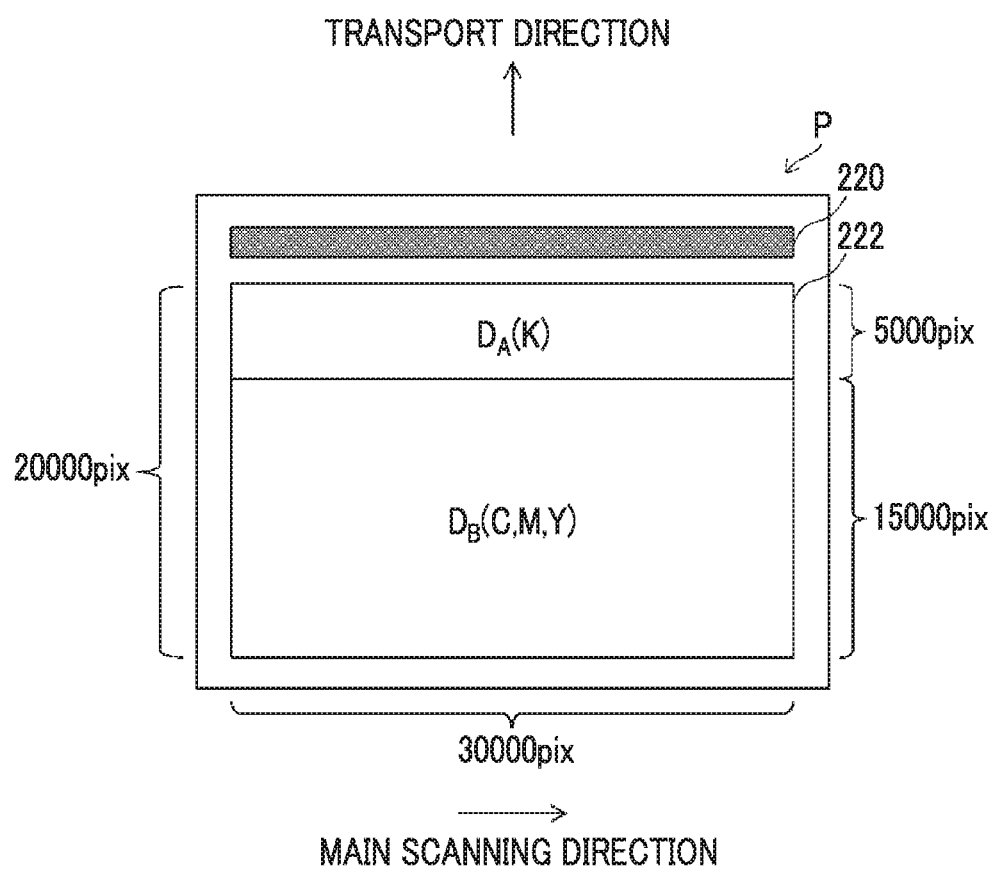
FIG. 11 is a diagram illustrating an example of a recorded image.

The recorded image shown in FIG. 11 is formed of a region $D_A$ on the upstream side of the image recording region 222 and a region $D_B$ on the downstream side thereof in the direction of transport of the sheet of paper P. The region $D_A$ is a region having a size of 30000 [pix] in the main scanning direction and 5000 [pix] in the direction of transport of the sheet of paper P, and recording is performed thereon in such a manner that the amount of applied black ink per one pixel is 6 [pL]. Further, the region $D_B$ is a region having a size of 30000 [pix] in the main scanning direction and 15000 [pix] in the direction of transport of the sheet of paper P, and recording is performed thereon in such a manner that the amounts of applied cyan, magenta, yellow inks per one pixel are 2 [pL].

Here, in a case where the proportion of the amount of the ejected ink of each color is defined as the printing proportion, the printing proportions r(C), r(M), r(Y), and r(K) of the respective colors are as follows.

$$r(C)=(2\cdot15000\cdot30000)/(2\cdot15000\cdot30000+2\cdot15000\cdot30000+2\cdot15000\cdot30000+6\cdot5000\cdot30000)=0.25$$

$$r(M)=(2\cdot15000\cdot30000)/(2\cdot15000\cdot30000+2\cdot15000\cdot30000+2\cdot15000\cdot30000+6\cdot5000\cdot30000)=0.25$$

$$r(Y)=(2\cdot15000\cdot30000)/(2\cdot15000\cdot30000+2\cdot15000\cdot30000+2\cdot15000\cdot30000+6\cdot5000\cdot30000)=0.25$$

$$r(K)=(6\cdot5000\cdot30000)/(2\cdot15000\cdot30000+2\cdot15000\cdot30000+2\cdot15000\cdot30000+6\cdot5000\cdot30000)=0.25$$

Here, in a case where the proportion of the number of ejection operations of the ink of each color is defined as the printing proportion, the printing proportions r(C), r(M), r(Y), and r(K) of the respective colors are as follows.

$$r(C)=(15000\cdot30000)/(15000\cdot30000+15000\cdot30000+15000\cdot30000+5000\cdot30000)=0.30$$

$$r(M)=(15000\cdot30000)/(15000\cdot30000+15000\cdot30000+15000\cdot30000+5000\cdot30000)=0.30$$

$$r(Y)=(15000\cdot30000)/(15000\cdot30000+15000\cdot30000+15000\cdot30000+5000\cdot30000)=0.30$$

$$r(K)=(5000\cdot30000)/(1\cdot5000\cdot30000+15000\cdot300000+15000\cdot30000+5000\cdot30000)=0.10$$

It is possible to adopt a configuration in which definitions of the printing proportion are selectively used in accordance with the recorded image. For example, in a case where the density is biased on the image, it is preferable to use a proportion of the number of ejection operations. The reason for this is as follows. In the case where the density is biased, inks, of which liquid droplet volumes are large, are collected at a part thereof. Therefore, the sheet of paper P is not fully colored with the amounts of used inks only, and thus the above-mentioned case is inefficient in terms of the density rather than a case where the screen is filled with inks of small liquid droplets. Consequently, by determining a degree of bias of the density of the recorded image, in a case where the degree of bias is small, the proportion of the amount of ejection may be used, or in a case where the degree of bias is large, the proportion of the number of ejection operations may be used.

<Third Embodiment>

An ink jet recording apparatus according to a third embodiment will be described. It should be noted that components the same as those of the ink jet recording apparatus 10 according to the first embodiment are represented by the same reference signs and numerals, and a detailed description thereof will be omitted.

<Defective Nozzle Detection Control Unit>

Figure 12:
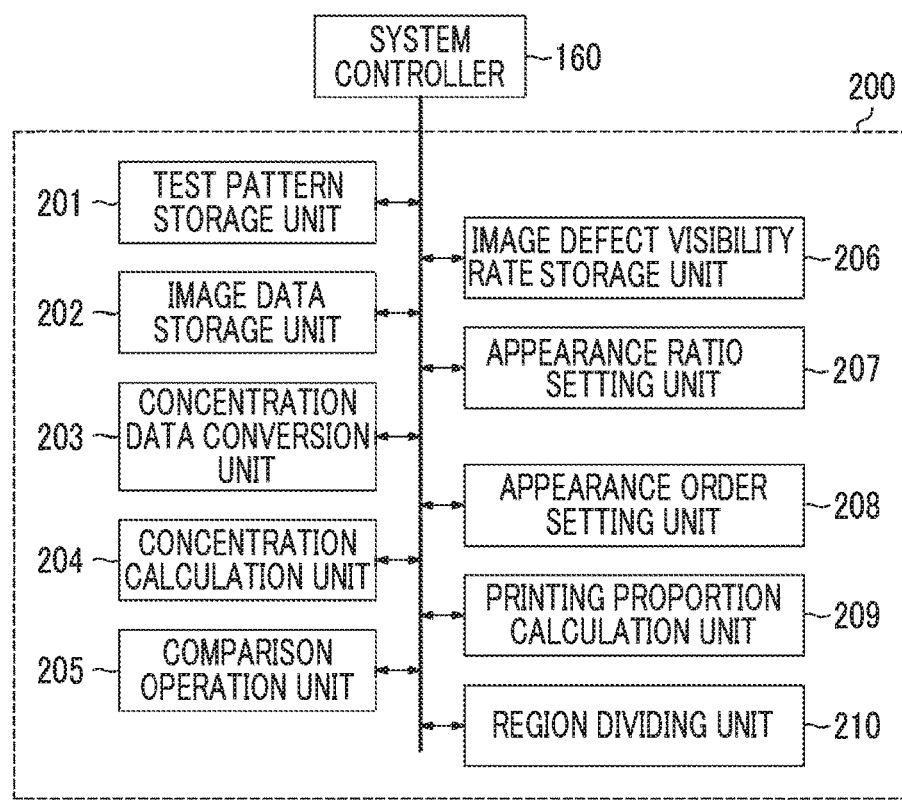
FIG. 12 is a block diagram illustrating an internal configuration of the defective nozzle detection control unit 200 according to a third embodiment.

The defective nozzle detection control unit 200 according to the third embodiment comprises, as shown in FIG. 12, the printing proportion calculation unit 209, and a region dividing unit 210. The region dividing unit 210 divides a recorded image into a plurality of regions for each predetermined distance in the main scanning direction. The printing proportion calculation unit 209 calculates a printing proportion for each of the regions into which the recorded image designated by the print job is divided by the region dividing unit 210.

The appearance ratio setting unit 207 sets appearance ratios of the test patterns which are recorded by the heads 120C, 120M, 120Y, and 120K for each of the regions divided by the region dividing unit 210. The appearance order setting unit 208 sets an order of appearance of the test patterns which are recorded by the heads 120C, 120M, 120Y, and 120K for each of the regions divided by the region dividing unit 210, on the basis of the appearance ratios which are set by the appearance ratio setting unit 207.

<Image Recording Operation>

Figure 13:
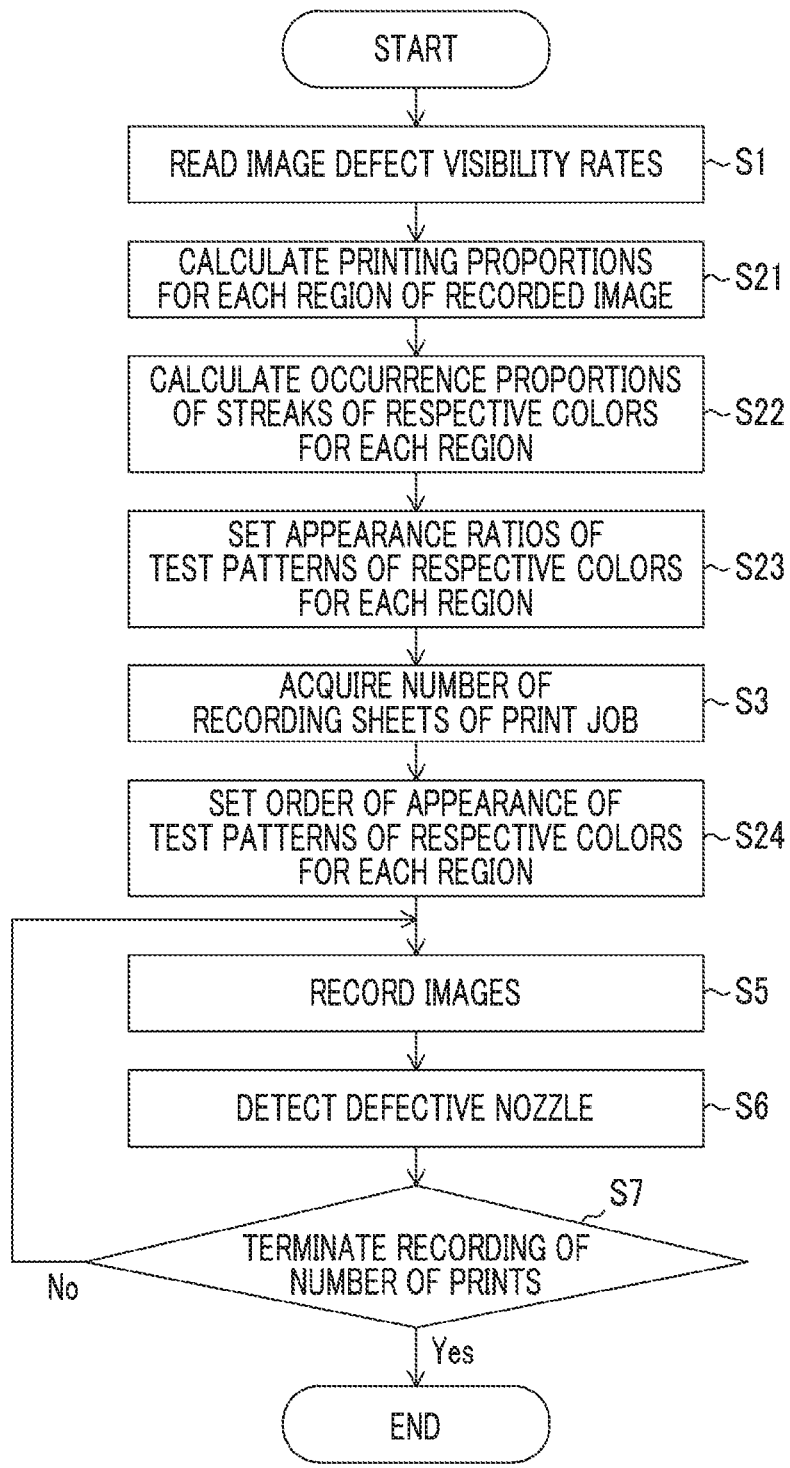
FIG. 13 is a flowchart illustrating an image recording operation of the ink jet recording apparatus 10 according to the third embodiment.

Next, an image recording operation of the ink jet recording apparatus 10 according to the third embodiment will be described with reference to the flowchart of FIG. 13. It should be noted that components the same as those of the flowchart of FIG. 8 are represented by the same reference signs and numerals, and a detailed description thereof will be omitted. The ink jet recording apparatus 10 divides the recorded image, and determines the appearance ratios of the respective colors of appropriate test patterns for defective nozzle detection for each divided region. Here, a plurality of images each having the same size is imposed as the recorded image.

(Step S1)

The appearance ratio setting unit 207 reads the image defect visibility rates of the respective color inks from the image defect visibility rate storage unit 206. Here, for example, it is assumed that the read image defect visibility rates are s(C)=0.2, s(M)=0.2, s(Y)=0.1, and s(K)=0.5.

(Step S21)

Figure 14:
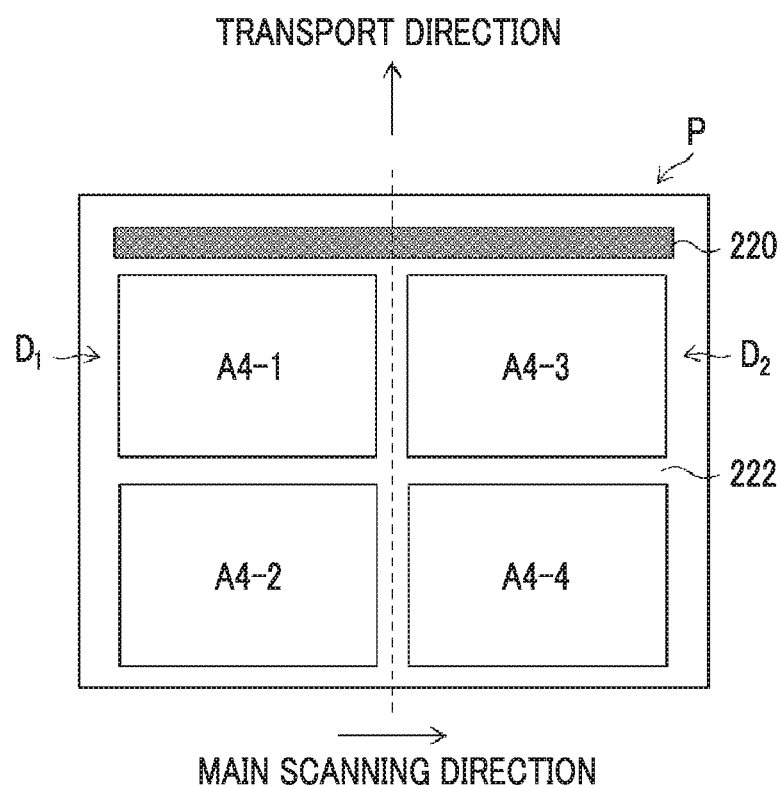
FIG. 14 is a diagram illustrating an example of imposition of a recorded image.

The recorded image designated by the print job is, as shown in FIG. 14, an image in which four images A4-1, A4-2, A4-3, and A4-4 having A4 sizes are imposed. Here, it is considered that red is dominant in the images A4-1 and A4-2 and blue is dominant in the images A4-3 and A4-4.

The region dividing unit 210 divides the recorded image into two regions (an example of the plurality of regions in the transport direction), that is, the region $D_1$ and the region $D_2$ on the left and right sides thereof in the transport direction.

The printing proportion calculation unit 209 calculates the printing proportions r(C), r(M), r(Y), and r(K) of the respective colors for each of the regions divided by the region dividing unit 210. Here, for example, the printing proportions of the respective colors of the region $D_1$ are $r_1(C)$=0.25, $r_1(M)$=0.50, $r_1(Y)$=0.25, and $r_1(K)$=0.00, and the printing proportions of the respective colors of the region $D_2$ are $r_2(C)$=0.50, $r_2(M)$=0.25, $r_2(Y)$=0.25, and $r_2(K)$=0.00.

(Step S22)

Next, the appearance ratio setting unit 207 calculates the occurrence proportions of streaks F(C), F(M), F(Y), and F(K) of the respective colors for each region through Expressions 12 to 15, on the basis of the image defect visibility rates, which are read from the image defect visibility rate storage unit 206, and the printing proportions which are calculated for each region by the printing proportion calculation unit 209.

That is, the occurrence proportions of streaks of the respective colors of the region $D_1$ are $F_1(C)$=0.29, $F_1(M)$=0.57, $F_1(Y)$=0.14, and $F_1(K)$=0.00, and the occurrence proportions of streaks of the respective colors of the region $D_2$ are $F_2(C)$=0.57, $F_2(M)$=0.29, $F_2(Y)$=0.14, and $F_2(K)$=0.00.

(Step S23)

Next, the appearance ratio setting unit 207 sets the appearance ratios of the test patterns A(C), A(M), A(Y), and A(K) which are respectively recorded for each region by the heads 120C, 120M, 120Y, and 120K, on the basis of the occurrence proportions of streaks of the respective colors for each region.

The appearance ratio setting unit 207 sets an appearance ratio as a higher value for each region as the occurrence proportion of streaks of each color becomes higher. Here, the appearance ratios A(C), A(M), A(Y), and A(K) of the respective colors for each region are set to be equal to the occurrence proportions of streaks F(C), F(M), F(Y), and F(K) for each region.

That is, the appearance ratios of the test patterns of the respective colors in the region $D_1$ are set as $A_1(C)$=0.29, $A_1(M)$=0.57, $A_1(Y)$=0.14, and $A_1(K)$=0.00, and the appearance ratios of the test patterns of the respective colors in the region $D_2$ are set as $A_2(C)$=0.57, $A_2(M)$=0.29, $A_2(Y)$=0.14, and $A_2(K)$=0.00.

(Step S3)

Next, the appearance order setting unit 208 acquires the number of prints j which is designated in the print job.

(Step S24)

Further, the appearance order setting unit 208 sets the order of appearance of the test patterns of the respective colors for each region, on the basis of the number of prints j which is acquired in step S3 and the appearance ratios A(C), A(M), A(Y), and A(K) for each of the regions which are set in step S23.

In this case, the appearance order setting unit 208 sets a test pattern, which is recorded first, as a test pattern having a color of which the appearance ratio is highest in each region, and sets an order in which the following test patterns of the respective colors are distributed in accordance with the appearance ratios.

Hereinafter, the process from step S5 may be performed in a manner similar to the first embodiment.

As described above, the recorded image is divided into the plurality of regions, and the occurrence proportions of streaks are calculated for each divided region, defective nozzle detection of the heads 120C, 120M, 120Y, and 120K of the respective colors is performed for each region at proportions corresponding to the calculated occurrence proportions of streaks. Therefore, it is possible to increase a frequency of defective nozzle detection for a recording head of a color, in which image defects easily occur, among the plurality of recording heads for each region. As a result, it is possible to efficiently detect a defective nozzle.

In order to efficiently use the present embodiment, at the time of imposition, it is preferable that images, for which ink having the same color is frequently used, are arranged in the direction of transport of the sheet of paper P. With such arrangement, since analysis can be performed principally on a head of the frequently used ink, it is possible to efficiently detect a defective nozzle.

<Fourth Embodiment>

A fourth embodiment will be described. The region dividing unit 210 of the ink jet recording apparatus 10 according to the fourth embodiment is different from that of the third embodiment in terms of the regions dividing the recorded image.

<Region Dividing Unit>

Figure 15:
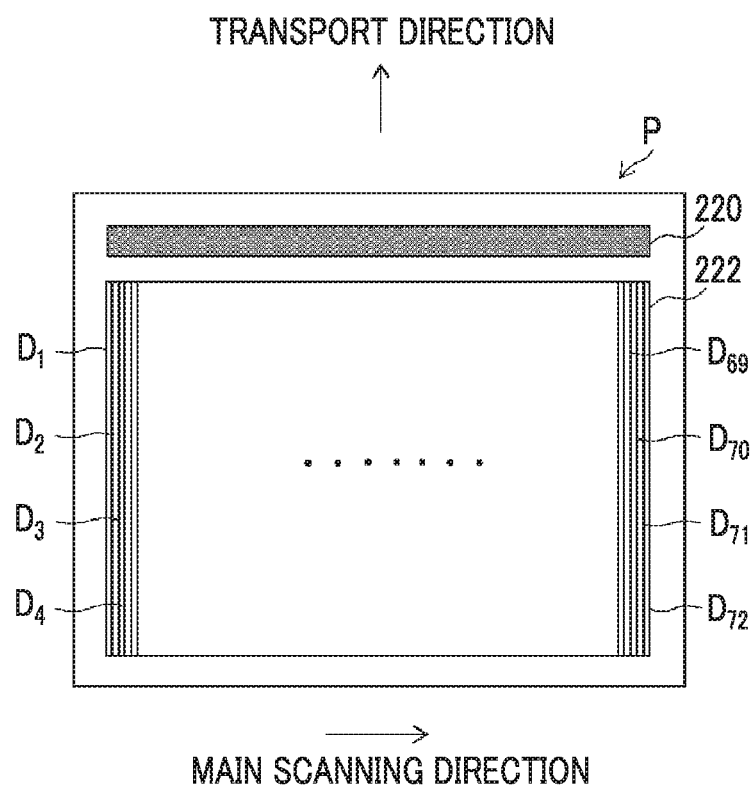
FIG. 15 is a diagram illustrating division of a recorded image performed by a region dividing unit 210.

The region dividing unit 210 according to the fourth embodiment divides the recorded image into the plurality of regions for each predetermined distance in the main scanning direction. In the example shown in FIG. 15, the size of the image recording region 222 in the main scanning direction is 720 [mm], and the recorded image is divided into 72 regions $D_1, D_2, D_3, D_4, \ldots, D_{69}, D_{70}, D_{71}$, and $D_{72}$ for each 10 [mm] in the main scanning direction (an example of the plurality of regions in the transport direction).

<Image Recording Operation>

Next, an image recording operation of the ink jet recording apparatus 10 according to the fourth embodiment will be described with reference to the flowchart of FIG. 13.

(Step S1)

The appearance ratio setting unit 207 reads the image defect visibility rates of the respective color inks from the image defect visibility rate storage unit 206. Here, it is assumed that the read image defect visibility rates of the respective colors are s(C)=0.2, s(M)=0.2, s(Y)=0.1, and s(K)=0.5.

(Step S21)

Figure 16:
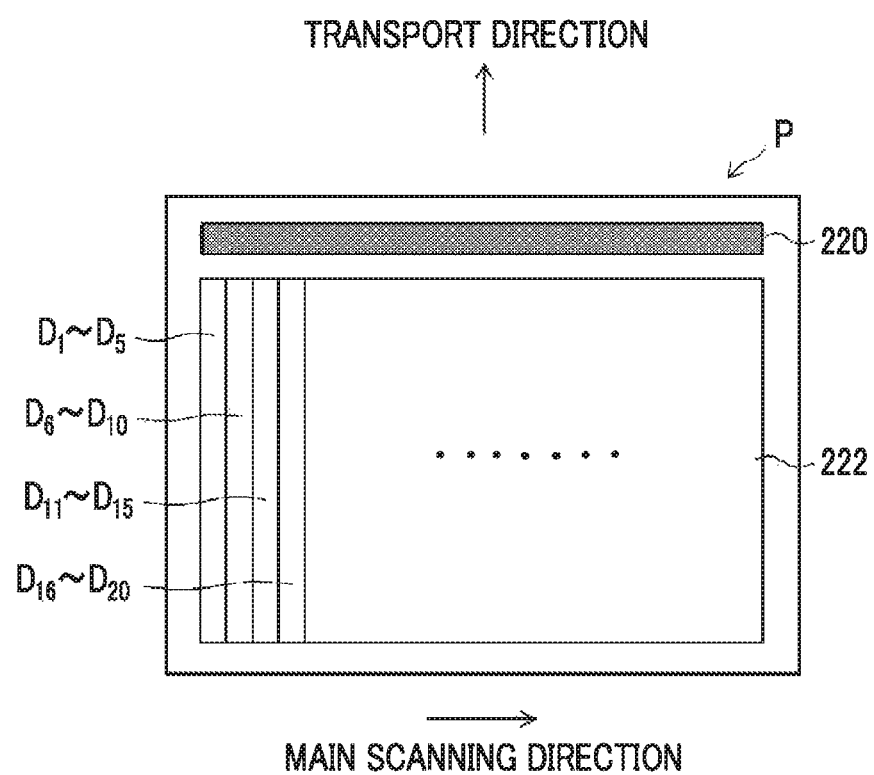
FIG. 16 is a diagram illustrating an example of a recorded image.

The printing proportion calculation unit 209 calculates the printing proportions r(C), r(M), r(Y), and r(K) of the respective colors for each of the regions divided by the region dividing unit 210, for the recorded image designated by the print job. FIG. 16 is a diagram illustrating an example of the recorded image designated by the print job. In the recorded image, the printing proportions of the regions $D_1$ to $D_5$ are r(C)=0.00, r(M)=1.00, r(Y)=0.00, and r(K)=0.00. The printing proportions of the regions $D_6$ to $D_{10}$ are r(C)=1.00, r(M)=0.00, r(Y)=0.00, and r(K)=0.00. The printing proportions of the regions $D_{11}$ to $D_{15}$ are r(C)=0.00, r(M)=0.00, r(Y)=0.00, and r(K)=1.00. The printing proportions of the regions $D_{16}$ to $D_{20}$ are r(C)=0.00, r(M)=0.00, r(Y)=1.00, and r(K)=0.00. It should be noted that a description of the regions $D_{21}$ to $D_{72}$ will be omitted.

(Step S22)

Next, the appearance ratio setting unit 207 calculates the occurrence proportions of streaks F(C), F(M), F(Y), and F(K) of the respective colors for each region through Expressions 12 to 15, on the basis of the image defect visibility rates, which are read from the image defect visibility rate storage unit 206, and the printing proportions which are calculated for each region by the printing proportion calculation unit 209.

In a case of the recorded image shown in FIG. 16, the occurrence proportions of streaks of the respective colors of the regions $D_1$ to $D_5$ are F(C)=0.00, F(M)=1.00, F(Y)=0.00, and F(K)=0.00, the occurrence proportions of streaks of the respective colors of the regions $D_6$ to $D_{10}$ are F(C)=1.00, F(M)=0.00, F(Y)=0.00, and F(K)=0.00, the occurrence proportions of streaks of the respective colors of the regions $D_{11}$ to $D_{15}$ are F(C)=0.00, F(M)=0.00, F(Y)=0.00, and F(K)=1.00, and the occurrence proportions of streaks of the respective colors of the regions $D_{16}$ to $D_{20}$ are F(C)=0.00, F(M)=0.00, F(Y)=1.00, and F(K)=0.00.

(Step S23)

Next, the appearance ratio setting unit 207 sets the appearance ratios of the test patterns A(C), A(M), A(Y), and A(K) which are respectively recorded for each region by the heads 120C, 120M, 120Y, and 120K, on the basis of the occurrence proportions of streaks of the respective colors for each region. Here, the appearance ratios A(C), A(M), A(Y), and A(K) of the respective colors for each region are set to be equal to the occurrence proportions of streaks F(C), F(M), F(Y), and F(K) for each region. That is, the appearance ratios of the test patterns of the respective colors in the regions $D_1$ to $D_5$ are set as A(C)=0.00, A(M)=1.00, A(Y)=0.00, and A(K)=0.00, the appearance ratios of the test patterns of the respective colors in the regions $D_6$ to $D_{10}$ are set as A(C)=1.00, A(M)=0.00, A(Y)=0.00, and A(K)=0.00, the appearance ratios of the test patterns of the respective colors in the regions $D_{11}$ to $D_{15}$ are set as A(C)=0.00, A(M)=0.00, A(Y)=0.00, and A(K)=1.00, and the appearance ratios of the test patterns of the respective colors in the regions $D_{16}$ to $D_{20}$ are set as A(C)=0.00, A(M)=0.00, A(Y)=1.00, and A(K)=0.00.

(Step S3)

Next, the appearance order setting unit 208 acquires the number of prints j which is designated in the print job.

(Step S24)

Further, the appearance order setting unit 208 sets the order of appearance of the test patterns of the respective colors for each region, on the basis of the number of prints j which is acquired in step S3 and the appearance ratios A(C), A(M), A(Y), and A(K) for each of the regions which are set in step S23.

In the regions $D_1$ to $D_5$, the regions $D_6$ to $D_{10}$, regions $D_{11}$ to $D_{15}$, the regions $D_{16}$ to $D_{20}$ of the recorded image of FIG. 16, the appearance ratios of the test patterns respectively are set to 1.00 respectively for magenta, cyan, black, and yellow. Consequently, regarding the test patterns for defective nozzle detection recorded by the test pattern recording region 220, magenta is in a range of 50 [mm], cyan is in a range of next 50 [mm], black is in a range of next 50 [mm], and yellow is in a range of next 50 [mm], from the left end of FIG. 16.

Hereinafter, the process from step S5 may be performed in a manner similar to the first embodiment.

As described above, the recorded image is divided into the plurality of regions, and the occurrence proportions of streaks are calculated for each divided region, defective nozzle detection of the heads 120C, 120M, 120Y, and 120K of the respective colors is performed for each region at proportions corresponding to the calculated occurrence proportions of streaks. Therefore, it is possible to increase a frequency of defective nozzle detection for a recording head of a color, in which image defects are easily visually perceived, among the plurality of recording heads. As a result, it is possible to efficiently detect a defective nozzle.

A technical scope of the present invention is not limited to the scope described in the above-mentioned embodiments. The configuration and the like of each embodiment may be appropriately combined without departing from the scope of the present invention.

EXPLANATION OF REFERENCES

10: ink jet recording apparatus
100: image recording unit
110: image recording drum
120C, 120M, 120Y, 120K, 120: ink jet head
130: imaging unit
168: image recording control unit
200: defective nozzle detection control unit
201: test pattern storage unit
202: image data storage unit
203: density data conversion unit
204: density calculation unit
205: comparison operation unit
206: image defect visibility rate storage unit
207: appearance ratio setting unit
208: appearance order setting unit
209: printing proportion calculation unit
210: region dividing unit
220: test pattern recording region
222: image recording region
251: nozzle

What is claimed is:

1. An image recording apparatus comprising:
   a plurality of recording heads that respectively eject inks with different colors from recording elements;
   a processor that is configured to acquire an indicator which relatively indicates how easily image defects are visually perceived for each color, and set an appearance ratio of a test pattern of a color having an indicator higher than an indicator of the other color to be higher than an appearance ratio of a test pattern of the other color;
   a recording unit for recording the test pattern of each color on a recording medium at the appearance ratio through the plurality of recording heads; and
   an imaging unit for capturing an image of the test pattern which is recorded on the recording medium, wherein the processor is further configured to analyze the captured test pattern and detect a defective recording element in the recording head that has recorded the test pattern.

2. The image recording apparatus according to claim 1, further comprising a storage unit for storing the indicator according to a density, wherein
the processor is configured to acquire the indicator according to the density of a recorded image.

3. The image recording apparatus according to claim 1, wherein the indicator, which relatively indicates how easily image defects are visually perceived for each color, is a proportion of the number of image defects which are visually perceived in an image of each color obtained by recording the same image for each ink color.

4. The image recording apparatus according to claim 2, wherein the indicator, which relatively indicates how easily image defects are visually perceived for each color, is a proportion of the number of image defects which are visually perceived in an image of each color obtained by recording the same image for each ink color.

5. The image recording apparatus according to claim 1, further comprising a printing proportion acquisition unit for acquiring a printing proportion of each color for the recorded image, wherein
the processor is configured to set the indicator of a color having a printing proportion higher than a printing proportion of the other color to be higher than the indicator of the other color.

6. The image recording apparatus according to claim 2, further comprising a printing proportion acquisition unit for acquiring a printing proportion of each color for the recorded image, wherein
the processor is configured to set the indicator of a color having a printing proportion higher than a printing proportion of the other color to be higher than the indicator of the other color.

7. The image recording apparatus according to claim 3, further comprising a printing proportion acquisition unit for acquiring a printing proportion of each color for the recorded image, wherein
the processor is configured to set the indicator of a color having a printing proportion higher than a printing proportion of the other color to be higher than the indicator of the other color.

8. The image recording apparatus according to claim 5, wherein the printing proportion of each color is a proportion of an amount of the ink of each color ejected for the recorded image.

9. The image recording apparatus according to claim 5, wherein the printing proportion of each color is a proportion of the number of ejection operations of the ink of each color ejected for the recorded image.

10. The image recording apparatus according to claim 5, wherein
the printing proportion acquisition unit divides the recorded image into a plurality of regions, and acquires the printing proportion of each color for each of the divided regions,
the processor is configured to set the appearance ratio for each of the divided regions, and
the recording unit records the test pattern of each color at the appearance ratio for each of the divided regions.

11. The image recording apparatus according to claim 8, wherein
the printing proportion acquisition unit divides the recorded image into a plurality of regions, and acquires the printing proportion of each color for each of the divided regions,
the processor is configured to set the appearance ratio for each of the divided regions, and
the recording unit records the test pattern of each color at the appearance ratio for each of the divided regions.

12. The image recording apparatus according to claim 9, wherein
the printing proportion acquisition unit divides the recorded image into a plurality of regions, and acquires the printing proportion of each color for each of the divided regions,
the processor is configured to set the appearance ratio for each of the divided regions, and
the recording unit records the test pattern of each color at the appearance ratio for each of the divided regions.

13. The image recording apparatus according to claim 10, further comprising a transporting unit for transporting the recording medium to the plurality of recording heads only once, wherein
the plurality of recording heads are a plurality of line heads each of which has recording elements arranged to extend in a direction perpendicular to a transport direction of the recording medium, and
the printing proportion acquisition unit divides the recorded image into a plurality of regions in the transport direction of the transporting unit.

14. The image recording apparatus according to claim 10, wherein the recorded image is an image in which a plurality of images each having the same size is imposed.

15. The image recording apparatus according to claim 13, wherein the recorded image is an image in which a plurality of images each having the same size is imposed.

16. The image recording apparatus according to claim 5, wherein the processor is configured to set the appearance ratio of a color to 0, in case where the indicator, the printing proportion, or a proportion of a product of the indicator and the printing proportion for the color is less than a threshold value.

17. The image recording apparatus according to claim 8, wherein the processor is configured to set the appearance ratio of a color to 0, in case where the indicator, the printing proportion, or a proportion of a product of the indicator and the printing proportion for the color is less than a threshold value.

18. The image recording apparatus according to claim 9, wherein the processor is configured to set the appearance ratio of a color to 0, in case where the indicator, the printing proportion, or a proportion of a product of the indicator and the printing proportion for the color is less than a threshold value.

19. The image recording apparatus according to claim 1, wherein
assuming that the number of recording heads is i and the number of test patterns to be recorded is j,
the recording unit records the first i test patterns by using the i recording heads one by one, and records the remaining (j-i) test patterns at the appearance ratio which is set for each color.

20. A method of detecting a defective recording element using the image recording apparatus according to claim 1 comprising:
an indicator acquisition step of acquiring an indicator which relatively indicates how easily image defects are visually perceived for each color of respective inks with different colors ejected from recording elements by a plurality of recording heads;
an appearance ratio setting step of setting an appearance ratio of a test pattern of a color having an indicator higher than an indicator of the other color to be higher than an appearance ratio of a test pattern of the other color;

a recording step of recording the test pattern of each color on a recording medium at the appearance ratio through the plurality of recording heads;

an imaging step of capturing an image of the test pattern which is recorded on the recording medium; and an analysis step of analyzing the captured test pattern and detecting a defective recording element in the recording head that has recorded the test pattern.

* * * * *